(12) United States Patent
Okawa et al.

(10) Patent No.: US 7,081,501 B2
(45) Date of Patent: *Jul. 25, 2006

(54) HYDROGENATED RING-OPENING METATHESIS POLYMER AND PROCESS FOR PRODUCING THE SAME

(75) Inventors: Yuichi Okawa, Sodegaura (JP); Tadahiro Sunaga, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/996,468

(22) Filed: Nov. 26, 2004

(65) Prior Publication Data

US 2005/0119412 A1    Jun. 2, 2005

(30) Foreign Application Priority Data

Dec. 1, 2003 (JP) .............................. 2003-401920

(51) Int. Cl.
*C08G 61/06* (2006.01)
*C08F 8/04* (2006.01)

(52) U.S. Cl. ................. 525/327.2; 525/338; 525/339; 525/940

(58) Field of Classification Search ................. 525/338, 525/327.2, 339, 940
See application file for complete search history.

(56) References Cited

U.S. PATENT DOCUMENTS

| 6,207,779 B1 | 3/2001 | Chang et al. |
| 6,800,720 B1 | 10/2004 | Yamamoto et al. |
| 2002/0001772 A1 | 1/2002 | Nishi et al. |
| 2002/0040109 A1 | 4/2002 | Fogg et al. |
| 2003/0018138 A1* | 1/2003 | Sakamoto et al. .......... 525/338 |

FOREIGN PATENT DOCUMENTS

| DE | 199 00 977 A1 | 1/2000 |
| EP | 1 275 676 A1 | 1/2003 |
| JP | 04-353444 A | 12/1992 |
| WO | 97/33198 A1 | 9/1997 |
| WO | 01/79324 A1 | 10/2001 |

OTHER PUBLICATIONS

English Abstract, Japanese Published Application No. 09-230595 published Sep. 5, 1997.
English Abstract, Japanese Published Application No. 09-244247 published Sep. 19, 1997.
English Abstract, Japanese Published Application No. 10-254139 published Sep. 25, 1998.

* cited by examiner

*Primary Examiner*—Fred Teskin
(74) *Attorney, Agent, or Firm*—Buchanan Ingersoll PC

(57) ABSTRACT

A hydrogenated ring-opening metathesis polymer containing at least structural units of the general formula [3] and/or the general formula [4] and the weight-average molecular weight Mw to the number-average molecular weight Mn (Mw/Mn) is more than 2.0 and less than 5.0:

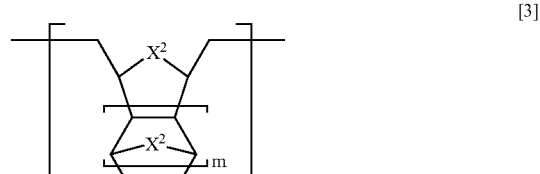

[3]

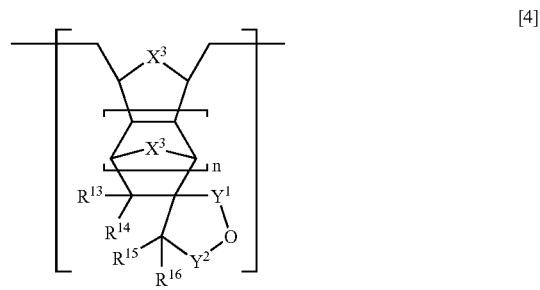

[4]

wherein $R^8$ to $R^{11}$ and $R^{13}$ to $R^{16}$ represent a hydrogen atom or an alkyl group having 1 to 10 carbon atoms, $X^2$s and $X^3$s are the same or different and represent —O— or —$CR^{12}_2$— wherein $R^{12}$ represents a hydrogen atom or an alkyl group having 1 to 10 carbon atoms, one of $Y^1$ and $Y^2$ represents —(C=O)— and the other of $Y^1$ and $Y^2$ represents —$CR^{18}_2$— wherein $R^{18}$ represents a hydrogen atom or an alkyl group having 1 to 10 carbon atoms, and m and n represent an integer of 0 or 1 to 3.

27 Claims, 1 Drawing Sheet

HYDROGENATED RING-OPENING METATHESIS POLYMER AND PROCESS FOR PRODUCING THE SAME

BACKGROUND OF THE INVENTION

1. Field of the Invention

The present invention relates to a hydrogenated ring-opening metathesis polymer having a specific molecular weight distribution, more particularly, a hydrogenated ring-opening metathesis polymer which is excellent in heat resistance, thermal decomposition resistance, light transmittance and the like and easy to be used as a resist film as compared with known polymers and a method of producing the hydrogenated polymer.

2. Description of the Related Art

With the recent increase of integration level in integrated circuits on semiconductor devices, large-scale integrated circuits (LSI) and very-large-scale integrated circuits (VLSI) have been put to practical use and additionally, the minimum lithographic pattern in an integrated circuit would be reaching in submicron feature and in future there is a tendency of further microlithographic. Formation of a microlithographic pattern essentially requires use of a lithographic technology in which a substrate to be treated on which a thin film is formed is coated with a resist material, selective exposure is conducted to form a latent image of a desired pattern, then development is conducted to form a resist pattern which is used as a mask in dry etching, and then the resist material is removed to obtain a desired pattern.

As the exposure light source used in this lithographic technology, ultraviolet lights such as g ray (wavelength: 436 nm) and i ray (wavelength: 365 nm) have been utilized, but with the progress of the fine lithographic pattern, exposure lights having a shorter wavelength such as far ultraviolet ray, vacuum ultraviolet ray, electron beam (EB), X ray and the like have become popular to use as a light source. Particularly recently, excimer lasers (KrF laser having a wavelength of 248 nm, ArF laser having a wavelength of 193 nm) have received attention as an exposure light source and are expected to be effective in formation of a fine lithographic pattern.

As polymers or copolymers used in a resist material forming a sub-micron pattern using exposure light in a region of vacuum ultraviolet ray, cyclic polymers as found in photoresist compositions comprising a polymer compound having a cyclic skeleton which contains an alicyclic hydrocarbon as the main chain and has a pendant acid cleavable group (see Patent Documents 1, 2, 3 and 4) have problems such as poor solubility in a resist solvent at high concentration, poor wettability to a developer, poor adhesion to a silicon substrate and the like, though these cyclic polymers are excellent in dry etching resistance and excellent in transparency to far ultraviolet ray.

To resolve such problems, the present inventors previously suggested a polymer having a narrow molecular weight distribution which was prepared by subjecting a specific cyclic olefin to living metathesis polymerization followed by hydrogenation (see Patent Document 5).

[Patent Document 1] WO97/33198
[Patent Document 2] JP-A No. 09-230595
[Patent Document 3] JP-A No. 09-244247
[Patent Document 4] JP-A No. 10-254139
[Patent Document 5] WO01/79324

SUMMARY OF THE INVENTION

The polymer disclosed in the above publications is useful to satisfy the above-mentioned various properties necessary for use as a base polymer for a resist material, more particularly, all of various properties necessary to be used as a base polymer for a resist material in a positive photoresist composition which is excellent in light transparency and the like, has high sensitivity and high resolution and has high affinity to an alkali developer and provides an excellent pattern, to be used for fine working of a semiconductor using ultraviolet ray and far ultraviolet ray (including excimer laser and the like). However, the polymer has some problems such as that the range of practical conditions for applying the polymer is narrow, which needs to be improved.

The present inventors have studied variously for solving the above-mentioned problems and as results, they have found that a hydrogenated ring-opening metathesis polymer of specific cyclic olefin-based monomer has excellent properties, leading to completion of the invention.

Namely, the present invention provides a hydrogenated ring-opening metathesis polymer which contains, if necessary, a structural unit. [A] of the following general formula [1]:

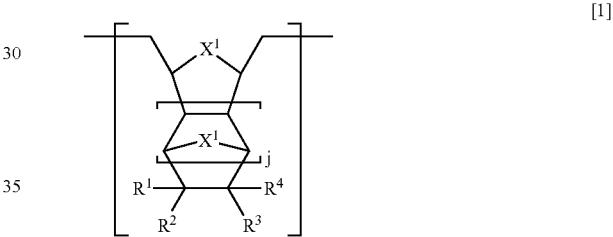

[1]

(wherein, at least one of $R^1$ to $R^4$ represents a functional group having a tertiary ester group of a cyclic alkyl of the following general formula [2]:

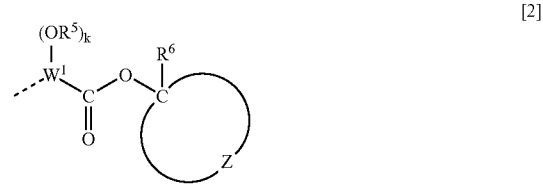

[2]

(wherein, the chain line represents a connecting means. $R^5$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms. $R^6$ represents a linear, branched or cyclic alkyl group having 1 to 10 carbon atoms. $W^1$ represents a single bond or a (k+2)-valent hydrocarbon group having 1 to 10 carbon atoms. Z represents a divalent hydrocarbon group having 2 to 15 carbon atoms and forms a single ring or a cross-linked ring together with carbon atoms to be bonded. k represents 0 or 1.) and the remaining groups of $R^1$ to $R^4$ are selected each independently from a hydrogen atom, a linear, branched or cyclic alkyl group having 1 to 20 carbon atoms, halogens, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms, $X^1$s may be the same or different and represent —O— or —$CR^7_2$— (wherein, $R^7$ represents a hydrogen atom or a linear or branched alkyl group having 1 to 10 carbon atoms). j represents an integer of 0 or 1 to 3.] and contains at least a structural unit [B] of the following general formula [3]:

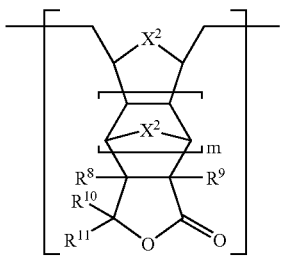

[3]

[wherein, $R^8$ to $R^{11}$ each independently represent a hydrogen atom or a linear, branched or cyclic alkyl group having 1 to 10 carbon atoms, $X^2$s may be the same or different and represent —O— or —$CR^{12}_2$— (wherein, $R^{12}$ represents a hydrogen atom or a linear or branched alkyl group having 1 to 10 carbon atoms). m represents an integer of 0 or 1 to 3.], and/or a structural unit [C] of the following general formula [4]:

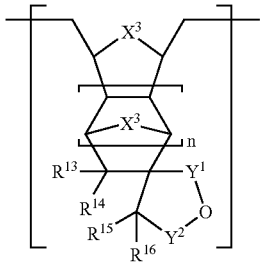

[4]

[wherein, $R^{13}$ to $R^{16}$ each independently represent a hydrogen atom or a linear, branched or cyclic alkyl group having 1 to 10 carbon atoms and $X^3$s may be the same or different and represent —O— or —$CR^{17}_2$— (wherein, $R^{17}$ represents a hydrogen atom or a linear or branched alkyl group having 1 to 10 carbon atoms). One of $Y^1$ and $Y^2$ represents —(C=O)— and the other of $Y^1$ and $Y^2$ represents —$CR^{18}_2$— (wherein, $R^{18}$ represents a hydrogen atom or a linear or branched alkyl group having 1 to 10 carbon atoms). n represents an integer of 0 or 1 to 3.], wherein at least one of $X^1$ in the structural unit [A] of the general formula [1], $X^2$ in the structural unit [B] of the general formula [3] and $X^3$ in the structural unit [C] of the general formula [4] represents —O—, and the constituting molar ratio of [A]/([B] and [C]) is 0/100 to 99/1 and the ratio of the weight-average molecular weight Mw to the number-average molecular weight Mn (Mw/Mn) is more than 2.0 and less than 5.0.

Further, the present invention provides a hydrogenated ring-opening metathesis polymer which further contains the structural unit [D] of the general formula [5]:

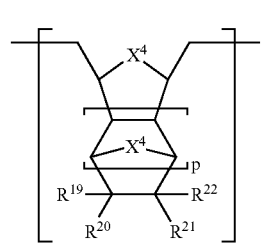

[5]

[wherein, at least one of $R^{19}$ to $R^{22}$ represents a functional group having a carboxyl group of the following general formula [6]:

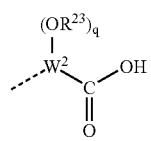

[6]

(wherein, the chain line represents a connecting means. $R^{23}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms. $W^2$ represents a single bond or a (q+2)-valent hydrocarbon group having 1 to 10 carbon atoms. q represents 0 or 1.) and the remaining groups of $R^{19}$ to $R^{22}$ are selected each independently from a hydrogen atom, a linear, branched or cyclic alkyl group having 1 to 20 carbon atoms, halogens, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $X^4$s may be the same or different and represent —O— or —$CR^{24}_2$— (wherein, $R^{24}$ represents a hydrogen atom or a linear or branched alkyl group having 1 to 10 carbon atoms). p represents an integer of 0 or 1 to 3.], in addition to the structural units [A] and [B] and/or [C].

Further, the present invention provides a hydrogenated ring-opening metathesis polymer which further contains the structural unit [E] of the general formula [7]:

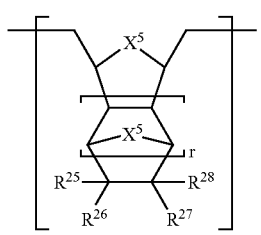

[7]

[wherein, at least one of $R^{25}$ to $R^{28}$ represents a functional group having a carboxylic acid ester group of the following general formula [8]:

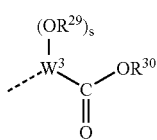

[8]

(wherein, the chain line represents a connecting means. $R^{29}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms. $R^{30}$ represents a linear or branched alkyl group having 1 to 10 carbon atoms, a linear, branched or cyclic alkoxyalkyl group having 2 to 10 carbon atoms, or a linear, branched or cyclic halogenated alkyl group having 1 to 20 carbon atoms. $W^3$ represents a single bond or a (s+2)-valent hydrocarbon group having 1 to 10 carbon atoms. s represents 0 or 1.) and the remaining groups of $R^{25}$ to $R^{28}$ are selected each independently from a hydrogen atom, a linear, branched or cyclic alkyl group having 1 to 20 carbon atoms, halogens, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $X^5$s may be the same or different and represent —O— or —$CR^{31}_2$— (wherein, $R^{31}$ represents a hydrogen atom or a linear or branched alkyl group having 1 to 10 carbon atoms). r represents an integer of 0 or 1 to 3.), in addition to the structural units [A] and [B] and/or [C] and preferably further in addition to [D].

Further, the present invention provides a method of producing a hydrogenated ring-opening metathesis polymer comprising using, if necessary, a cyclic olefin monomer of the following general formula [9]:

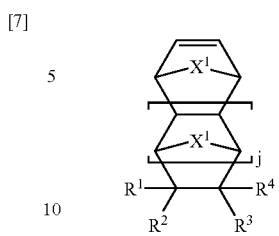

[9]

(wherein, $R^1$ to $R^4$, $X^1$ and j are as defined in the general formula [1].) and at least a cyclic olefin monomer of the following general formula [10]:

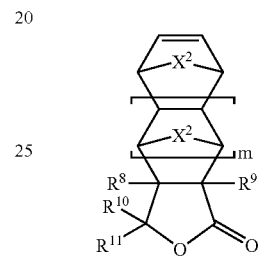

[10]

(wherein, $R^8$ to $R^{11}$, $X^2$ and m are as defined in the general formula [3].) and/or a cyclic olefin monomer of the following general formula [11]:

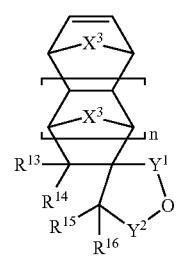

[11]

(wherein, $R^{13}$ to $R^{16}$, $X^3$, $Y^1$, $Y^2$ and n are as defined in the general formula [4].), wherein at least one of $X^1$ in the general formula [9], $X^2$ in the general formula [10] and $X^3$ in the general formula [11] represents —O—, and polymerizing these monomers by using a ring-opening metathesis catalyst, and hydrogenating the resulted polymer in the presence of a hydrogenation catalyst. Further, the present invention provides the method of producing a hydrogenated ring-opening metathesis polymer, comprising cleaving at least part of the cyclic alkyl tertiary ester group in the general formula [2] to a carboxyl group after hydrogenation.

Further, the present invention provides a method of producing a hydrogenated ring-opening metathesis polymer-comprising using further a cyclic olefin monomer of the following general formula [12]:

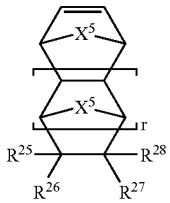

[wherein, $R^{25}$ to $R^{28}$, $X^5$ and r are as defined in the general formula [7].), in addition to cyclic olefin monomers of the general formula [9] and [10] and/or [11]. Further, the present invention provides the method of producing a hydrogenated ring-opening metathesis polymer comprising cleaving at least part of the cyclic alkyl tertiary ester group to a carboxyl group after hydrogenation.

The polymer having a broad molecular weight distribution of the present invention has good film formability and can easily form films of different thickness, which makes it very valuable industrially.

DESCRIPTION OF THE PREFERRED EMBODIMENTS

Figure 1:
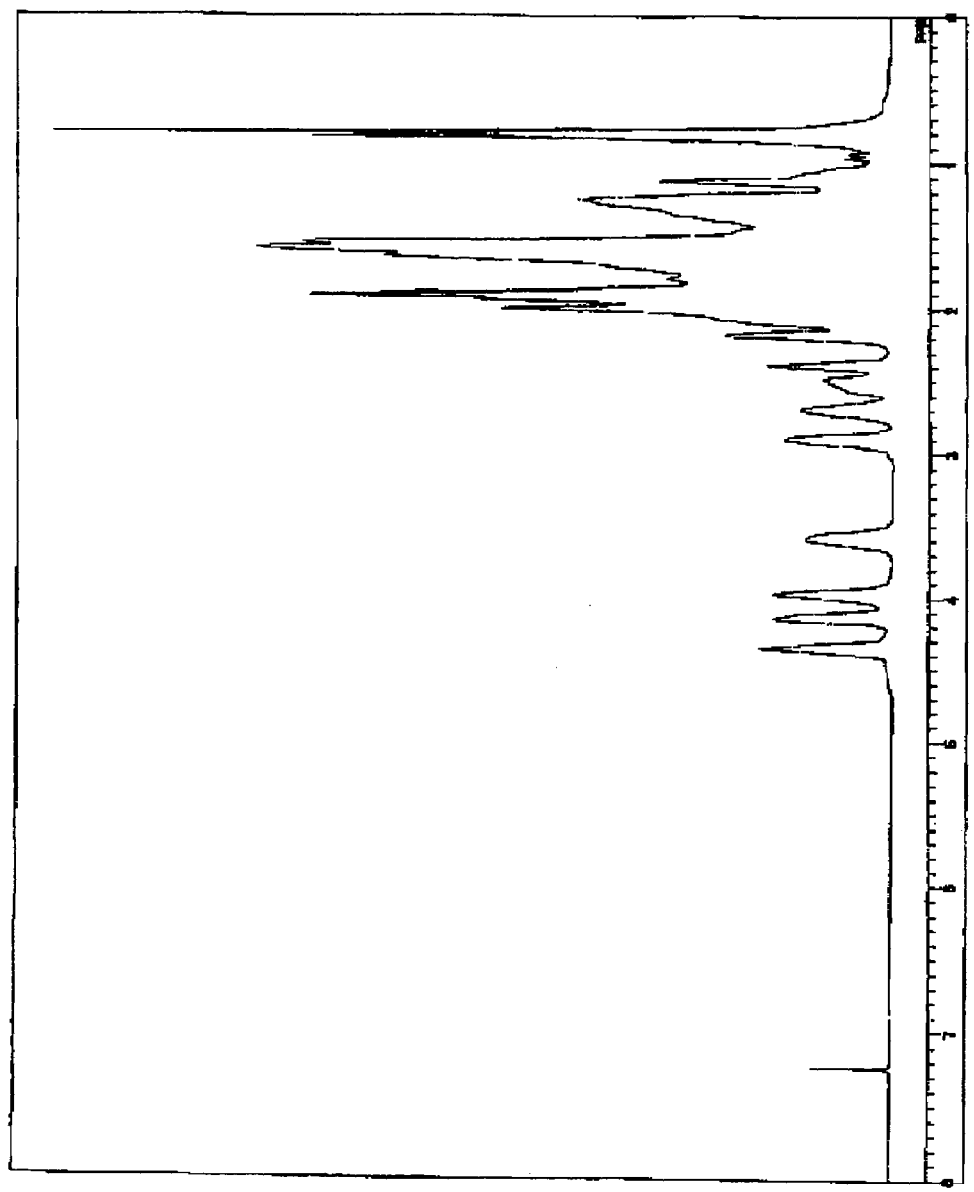
FIG. 1 shows a $^1$H-NMR spectrum (270 MHz, solvent is deuterated chloroform) of a hydrogenated ring-opening metathesis polymer obtained in Example 1.

In the general formula [1] of the present invention, at least one of $R^1$ to $R^4$ represents a functional group having a tertiary ester group of a cyclic alkyl in the general formula [2]:

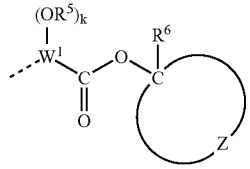

(wherein, the chain line represents a connecting means. $R^5$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms. $R^6$ represents a linear, branched or cyclic alkyl group having 1 to 10 carbon atoms. $W^1$ represents a single bond or a (k+2)-valent hydrocarbon group having 1 to 10 carbon atoms. Z represents a divalent hydrocarbon group having 2 to 15 carbon atoms and forms a single ring or a cross-linked ring together with carbon atoms to be bonded. k represents 0 or 1.).

Regarding $R^5$, examples of the linear, branched or cyclic alkyl group having 1 to 10 carbon atoms includes methyl, ethyl, propyl, isopropyl, n-butyl, isobutyl, tert-butyl, cyclopentyl, cyclohexyl, 1-ethylcyclopentyl, 1-ethylcyclohexyl and the like, examples of the linear, branched or cyclic alkoxyalkyl group having 2 to 10 carbon atoms includes methoxymethyl, 1-ethoxyethyl, 1-tert-butoxyethyl, 1-cyclohexyloxyethyl, 1-ethoxypropyl, 1-ethoxy-1-methylethyl, tetrahydrofuran-2-yl, tetrahydropyran-2-yl and the like, and examples of the linear, branched or cyclic acyl group having 1 to 10 carbon atoms includes formyl, acetyl, pivaloyl, cyclohexylcarbonyl and the like. Among these groups $R^5$, a linear or branched alkyl group having 1 to 6 carbon atoms, a linear, branched or cyclic alkoxyalkyl group having 2 to 7 carbon atoms and a linear or branched acyl group having 2 to 7 carbon atoms are preferable, and a hydrogen atom, methyl, ethyl, methoxymethyl, 1-ethoxyethyl, tetrahydrofuran-2-yl and acetyl are particularly preferable.

Regarding $R^6$, examples of the linear, branched or cyclic alkyl group having 1 to 10 carbon atoms includes methyl, ethyl, propyl, isopropyl, n-butyl, isobutyl, tert-butyl, cyclopentyl, cyclohexyl, cyclooctyl, norbornyl, 1-methylcyclopentyl, 1-ethylcyclopentyl, 1-methylcyclohexyl, 1-ethylcyclohexyl, 1-methylnorbornyl, 1-ethylnorbornyl and the like, and among them, methyl, ethyl, propyl, isopropyl, n-butyl, isobutyl, tert-butyl, cyclopentyl, cyclohexyl, norbornyl, 1-ethylcyclopentyl and 1-ethylcyclohexyl are preferable.

Regarding $W^1$, the (k+2)-valent hydrocarbon group having 1 to 10 carbon atoms is a linear, branched or cyclic divalent hydrocarbon group having 1 to 10 carbon atoms when k is 0, and examples thereof include methylene, dimethylmethylene, ethylidene, propylidene, butylidene, ethylene, 1-methylethylene, 2-methylethylene, 1-ethylethylene, 2-ethylethylene, 1,1-dimethylethylene, 1,2-dimethylethylene, 2,2-dimethylethylene, 1-ethyl-2-methylethylene, trimethylene, 1-methyltrimethylene, 2-methyltrimethylene, 3-methyltrimethylene, tetramethylene, pentamethylene, 1,1-cyclopentylene, 1,2-cyclopentylene, 1,3-cyclopentylene, 1,1-cyclohexylene, 1,2-cyclohexylene, 1,3-cyclohexylene, 1,4-cyclohexylene and the like. Among them, methylene, ethylidene, ethylene, 1-methylethylene, 2-methylethylene, trimethylene and 2-methyltrimethylene are preferable. When k is 1, for example, those having a connecting means formed by removing one hydrogen atom at any position on the hydrocarbon group as described above when k is 0, are listed. Most preferably, $W^1$ is a single bond.

Z represents a divalent hydrocarbon group having 2 to 15 carbon atoms, and forms a single ring or a cross-linked ring together with carbon atoms to be bonded. For example, 1-alkylcycloalkyl group of the following general formula [13]:

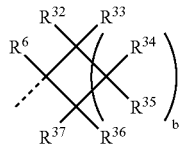

(wherein, the chain line represents a connecting means. $R^6$ is as defined above. $R^{32}$ to $R^{37}$ each independently represents a hydrogen atom or a linear, branched or cyclic alkyl group having 1 to 10 carbon atoms. b represents an integer of 0 or 1 to 6. When b is 2 to 6, a plurality of $R^{34}$ and $R^{35}$ may be the same or different, respectively.), 2-alkylnorbornyl group of the following general formula [14]:

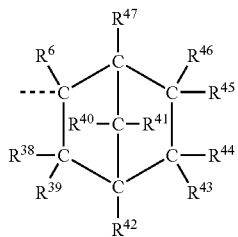

[14]

(wherein, the chain line represents a connecting means. $R^6$ is as defined above. $R^{38}$ to $R^{47}$ each independently represents a hydrogen atom or a linear, branched or cyclic alkyl group having 1 to 10 carbon atoms.), and 2-alkyl-2-adamantyl group such as 2-methyl-2-adamantyl, 2-ethyl-2-adamantyl and the like, are listed. Specific examples of the general formula [13] include 1-methylcyclopropyl, 1-methylcyclobutyl, 1-ethylcyclobutyl, 1-methylcyclopentyl, 1-ethylcyclopentyl, 1-n-propylcyclopentyl, 1-iso-propylcyclopentyl, 1-tert-butylcyclopentyl, 1-cyclopentylcyclopentyl, 1-cyclohexylcyclopentyl, 1-norbornylcyclopentyl, 1-methylcyclohexyl, 1-ethylcyclohexyl, 1-methylcycloheptyl, 1-ethylcycloheptyl, 1-methylcyclooctyl, 1-methylcyclononyl and the like, and among them, 1-alkylcyclopentyl of the chemical formula [13-1] to [13-8]:

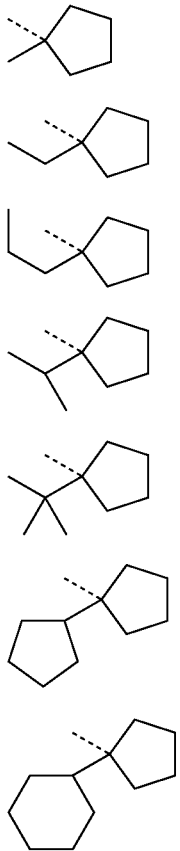

such as 1-methylcyclopentyl, 1-ethylcyclopentyl, 1-n-propylcyclopentyl, 1-iso-propylcyclopentyl, 1-tert-butylcyclopentyl, 1-cyclopentylcyclopentyl, 1-cyclohexylcyclopentyl and 1-norbornylcyclopentyl are preferable, and 1-methylcyclopentyl [13-1] and 1-ethylcyclopentyl [13-2] are more preferable. Specific examples of the general formula [14] include 2-alkylnorbornyl group of the chemical formula [14-1] to [14-11]:

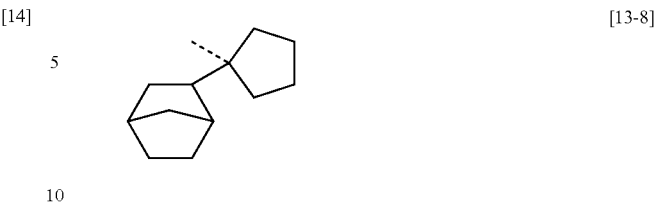

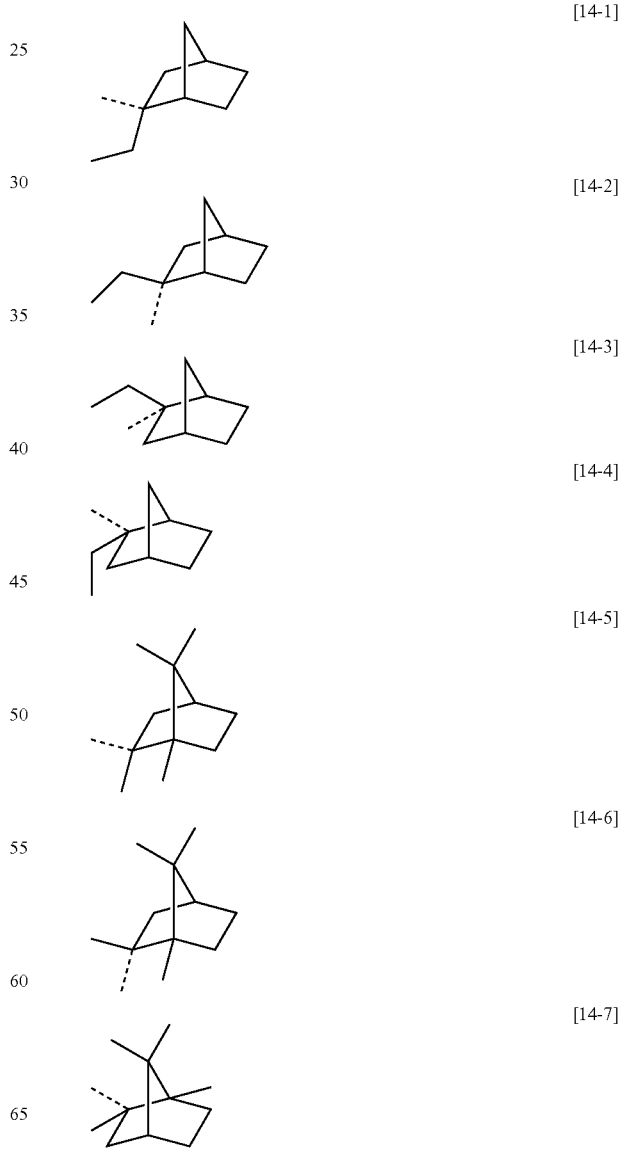

-continued

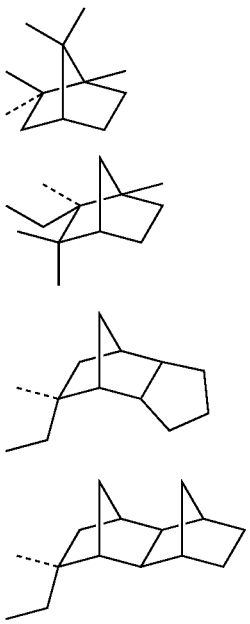

[14-8]

[14-9]

[14-10]

[14-11]

and the like, and among them, groups [14-1], [14-2], [14-3] and [14-4] are preferable.

Regarding the other groups of $R^1$ to $R^4$, a hydrogen atom, a linear, branched or cyclic alkyl group having 1 to 20 carbon atoms such as methyl, ethyl, propyl, isopropyl, n-butyl, tert-butyl, cyclohexyl, menthyl and the like, halogens such as a chlorine atom, a bromine atom, an iodine atom, a fluorine atom and the like, a linear, branched or cyclic halogenated alkyl group having 1 to 20 carbon atoms such as fluoromethyl, chloromethyl, bromomethyl, difluoromethyl, dichloromethyl, dibromomethyl, trifluoromethyl, trichloromethyl, tribromomethyl and the like, a linear, branched or cyclic alkoxy group having 1 to 12 carbon atoms such as methoxy, ethoxy, isopropoxy, n-butoxy, tert-butoxy, menthoxy and the like, a linear, branched or cyclic alkoxyalkyl group having 2 to 20 carbon atoms such as methoxymethyl, methoxyethyl, tert-butoxymethyl, tert-butoxyethyl, methoxymenthol and the like, or containing alkoxy saccharides such as methylglucose and the like, a linear, branched or cyclic alkylcarbonyloxy group having 2 to 20 carbon atoms such as acetoxy and the like, an arylcarbonyloxy group having 6 to 20 carbon atoms such as naphthoyloxy, a linear, branched or cyclic alkylsulfonyloxy group having 1 to 20 carbon atoms such as mesyloxy and the like, an arylsulfonyloxy group having 6 to 20 carbon atoms such as tosyloxy and the like, a linear, branched or cyclic alkoxycarbonyl group having 2 to 20 carbon atoms such as methoxycarbonyl, ethoxycarbonyl, n-propoxycarbonyl, isopropoxycarbonyl, n-butoxycarbonyl, tert-butoxycarbonyl, cyclohexyloxycarbonyl and the like, a linear, branched or cyclic alkoxycarbonylalkyl group having 3 to 20 carbon atoms such as methoxycarbonylmethyl, 2-(methoxycarbonyl)ethyl, 1-(methoxycarbonyl)ethyl, ethoxycarbonylmethyl, 2-(ethoxycarbonyl)ethyl, n-propoxycarbonylmethyl, isopropoxycarbonylmethyl, n-butoxycarbonylmethyl, tert-butoxycarbonylmethyl, cyclohexyloxycarbonylmethyl and the like, are each independently listed as specific examples thereof. Among them, a hydrogen atom, a linear, branched or cyclic alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkoxycarbonyl group having 2 to 20 carbon atoms and a linear, branched or cyclic alkoxycarbonylalkyl group having 3 to 20 carbon atoms, more preferably, a hydrogen atom, a linear or branched alkyl group having 1 to 10 carbon atoms, a linear or branched alkoxycarbonyl group having 2 to 10 carbon atoms and a linear or branched alkoxycarbonylalkyl group having 3 to 10 carbon atoms are more preferable.

$X^1$ represents —O— or —$CR^7{}_2$— (wherein, $R^7$ represents a hydrogen atom or a linear or branched alkyl group having 1 to 10 carbon atoms) and when j is 1 to 3, $X^1$s may be the same or different. Specific examples of $R^7$ include a hydrogen atom and a linear or branched alkyl group having 1 to 10 carbon atoms such as methyl, ethyl, n-propyl, isopropyl, n-butyl, tert-butyl and the like. $X^1$ represents preferably —O— or —$CH_2$—, and more preferably, all of $X^1$s are either —O— or —$CH_2$—. j represents preferably 0 or 1.

Namely, specific examples of the general formula [1], structural unit [A] of the chemical formula [1-1] to [1-64]:

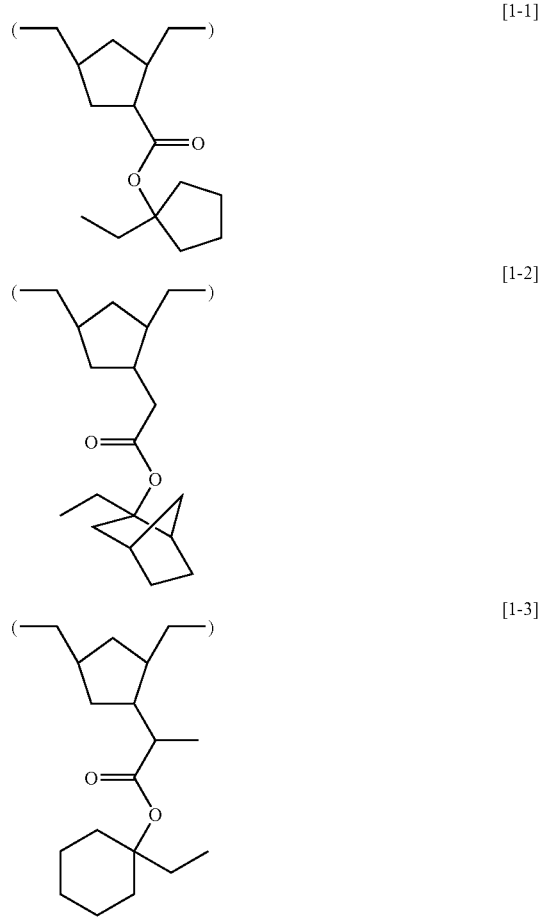

[1-1]

[1-2]

[1-3]

[1-4]
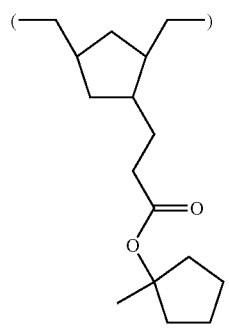
[1-5]
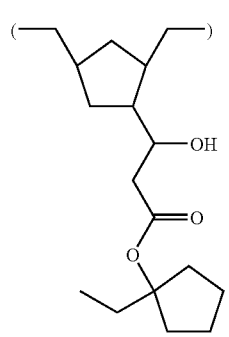
[1-6]
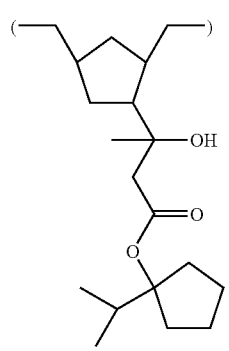
[1-7]
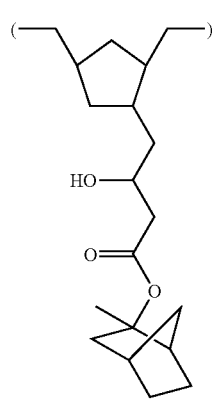
[1-8]
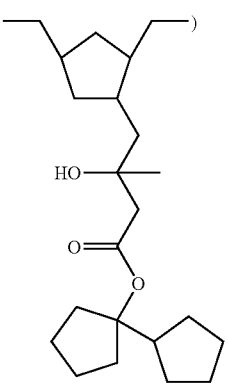
[1-9]
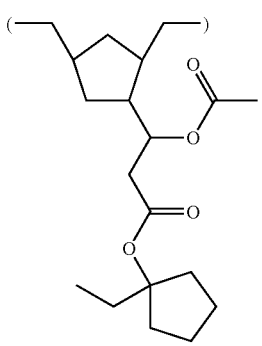
[1-10]
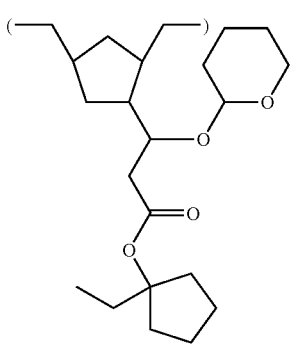
[1-11]
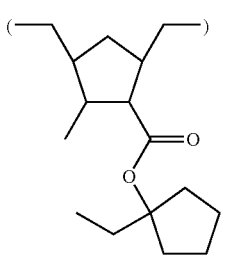
[1-12]
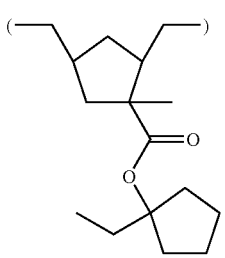

-continued
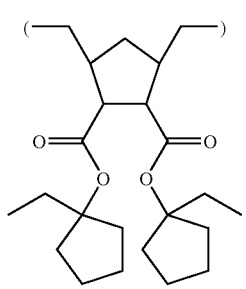
[1-13]
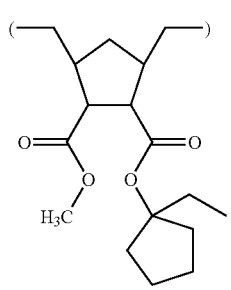
[1-14]
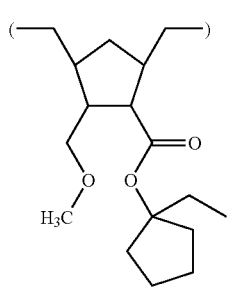
[1-15]
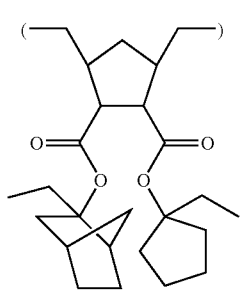
[1-16]
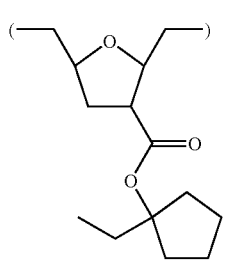
[1-17]
-continued
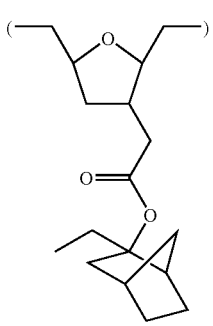
[1-18]
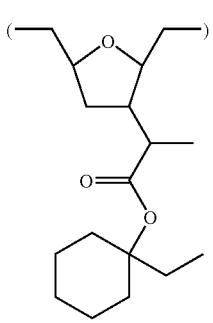
[1-19]
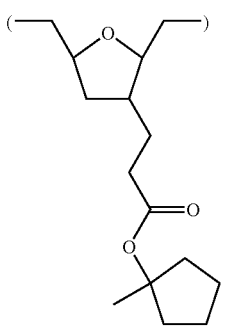
[1-20]
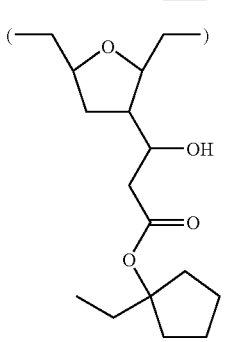
[1-21]
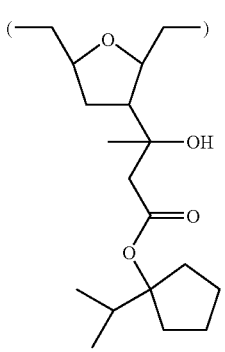
[1-22]

-continued
[1-23]
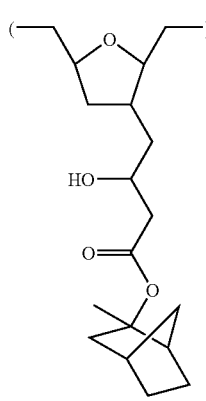
[1-24]
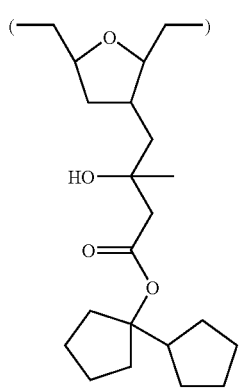
[1-25]
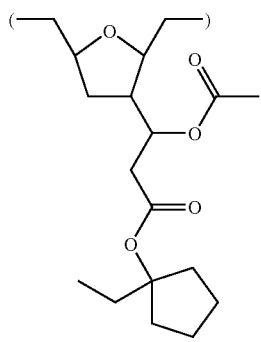
[1-26]
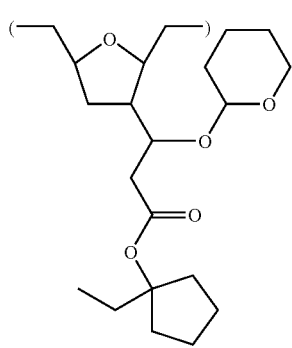
-continued
[1-27]
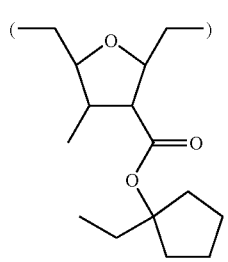
[1-28]
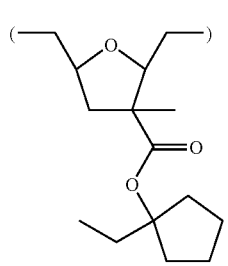
[1-29]
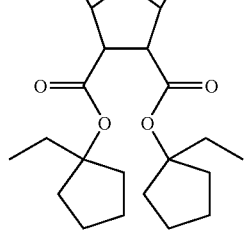
[1-30]
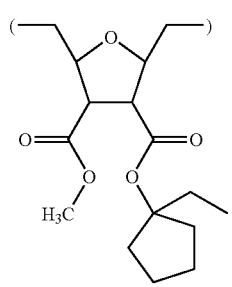
[1-31]
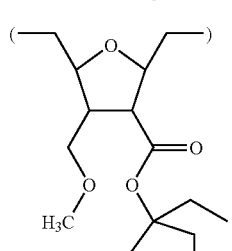
[1-32]
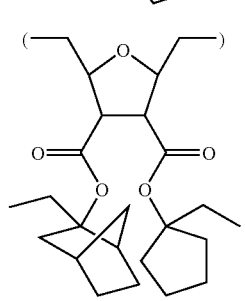

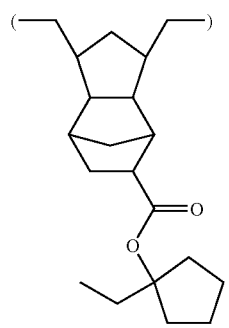 [1-33]
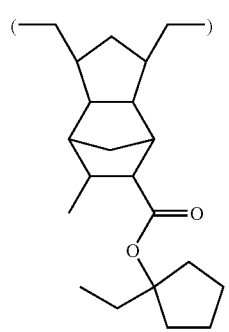 [1-34]
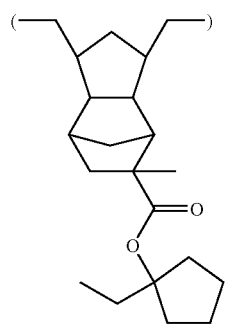 [1-35]
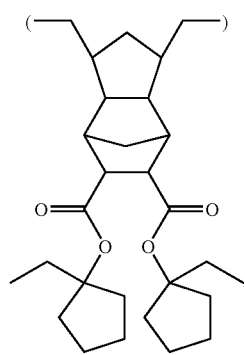 [1-36]
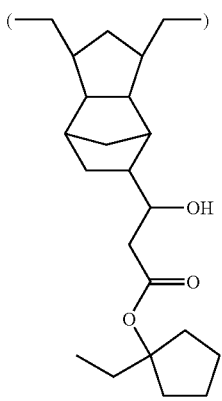 [1-37]
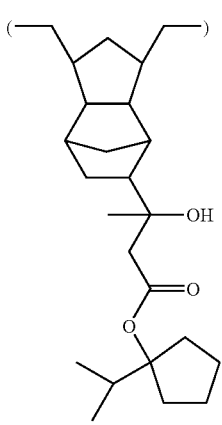 [1-38]
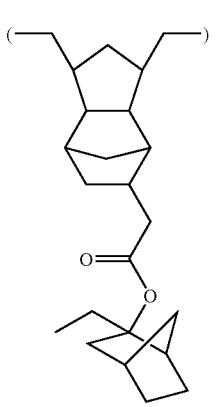 [1-39]
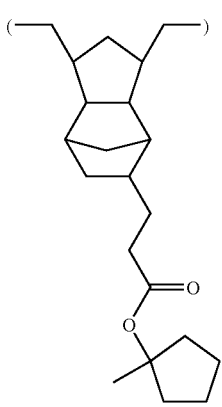 [1-40]

-continued
[1-41]
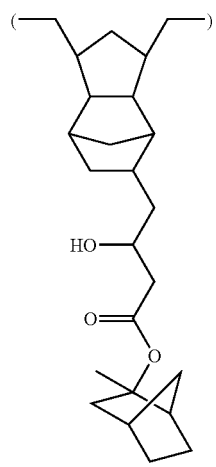
[1-42]
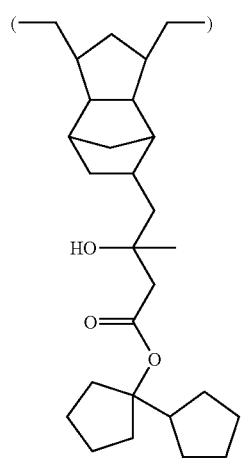
[1-43]
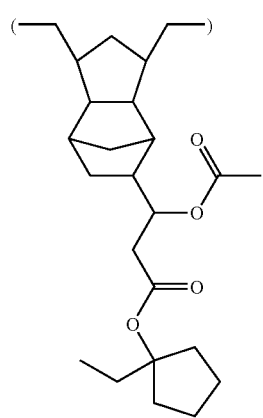
[1-44]
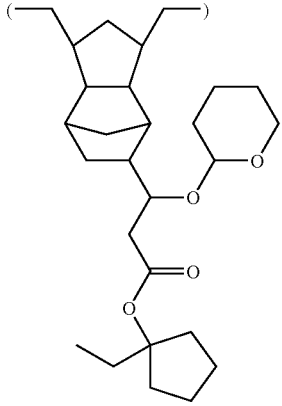
[1-45]
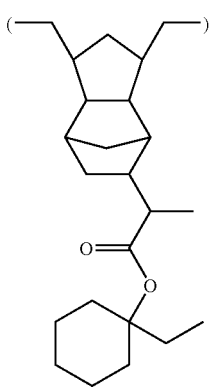
[1-46]
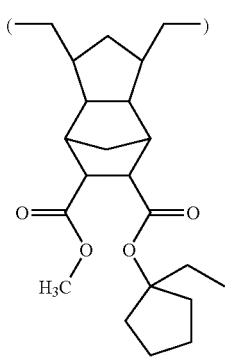
[1-47]
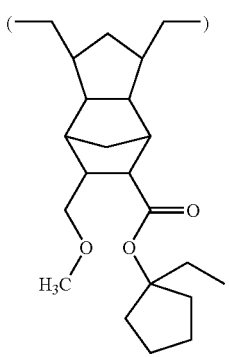

[1-48]
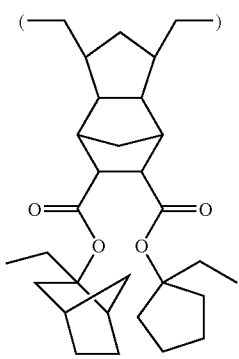
[1-49]
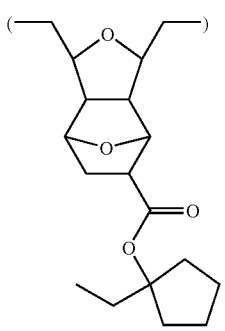
[1-50]
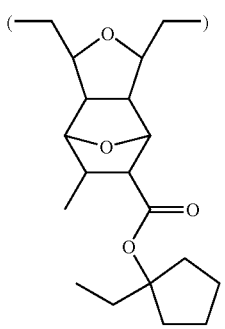
[1-51]
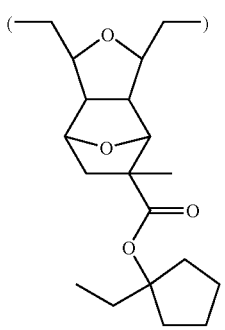
[1-52]
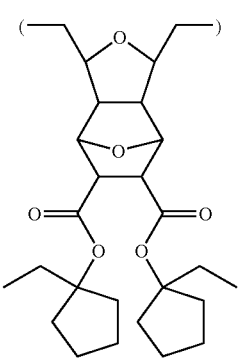
[1-53]
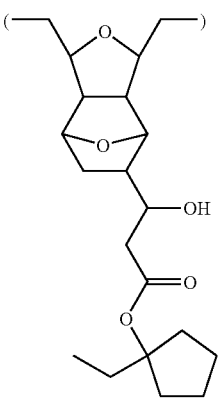
[1-54]
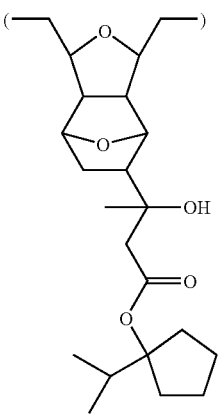
[1-55]
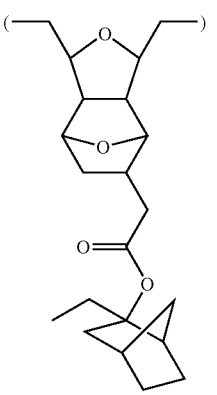

[1-56]
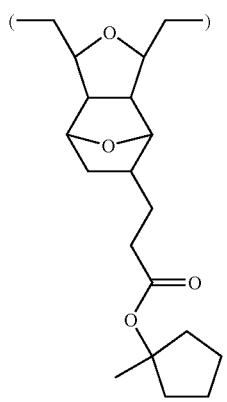
[1-57]
[1-58]
[1-59]
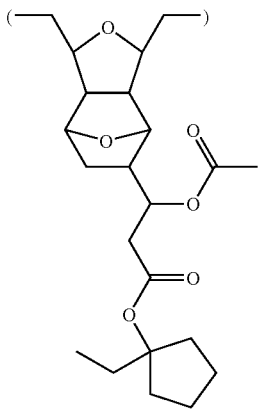
[1-60]
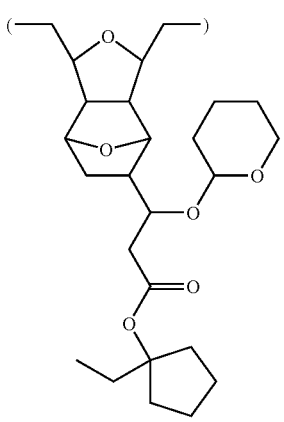
[1-61]
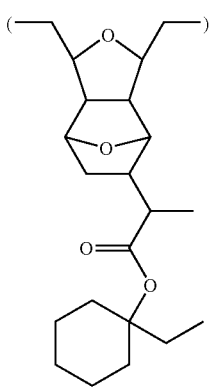
[1-62]
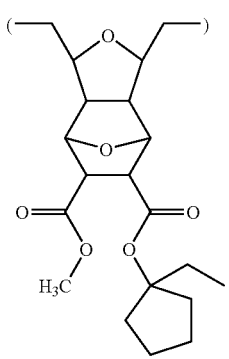

-continued

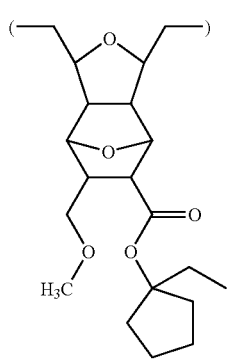
[1-63]

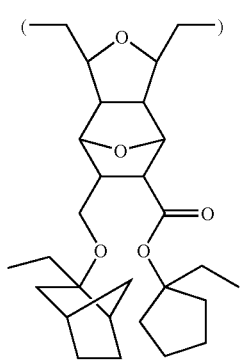
[1-64]

and the like.

Further, regarding the general formula [3], $R^8$ to $R^{11}$ each independently represent a hydrogen atom or a linear, branched or cyclic alkyl group having 1 to 10 carbon atoms such as methyl, ethyl, n-propyl, isopropyl, n-butyl, tert-butyl, cyclohexyl, menthyl and the like. $X^2$ represents —O— or —$CR^{12}_2$— (wherein, $R^{12}$ represents a hydrogen atom or a linear or branched alkyl group having 1 to 10 carbon atoms) and when m is 1 to 3, $X^2$ may be the same or different. Specific examples of $R^{12}$ include a hydrogen atom or a linear or branched alkyl group having 1 to 10 carbon atoms such as methyl, ethyl, n-propyl, isopropyl, n-butyl and tert-butyl and the like. $X^2$ represents preferably —O— or —$CH_2$—, and more preferably, all of $X^2$s are either —O— or —$CH_2$—. m is preferably 0 or 1.

Namely, specific examples of the general formula [3], structural unit [B] of the chemical formula [3-1] to [3-16]:

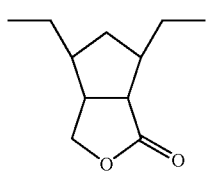
[3-1]

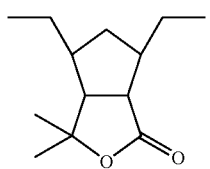
[3-2]

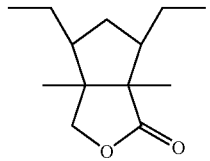
[3-3]

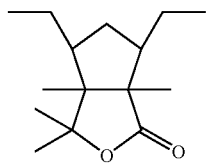
[3-4]

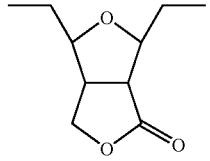
[3-5]

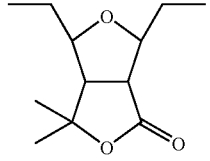
[3-6]

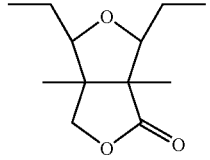
[3-7]

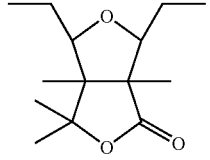
[3-8]

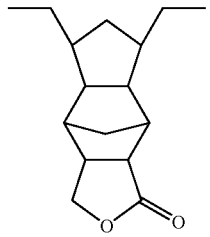
[3-9]

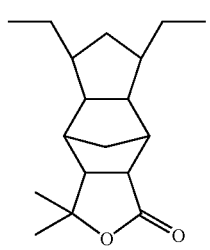
[3-10]

-continued

[3-11]
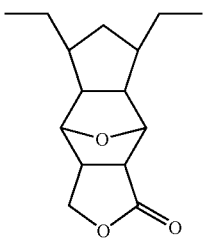

[3-12]
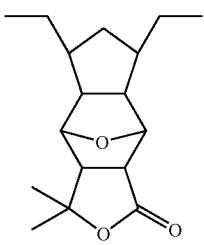

[3-13]
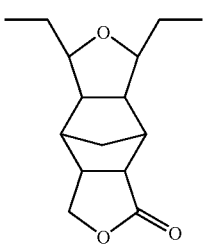

[3-14]
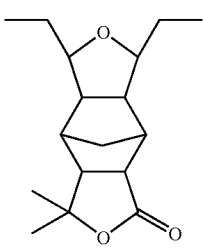

[3-15]
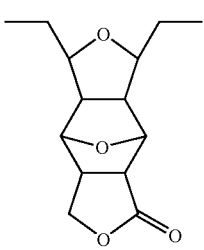

[3-16]
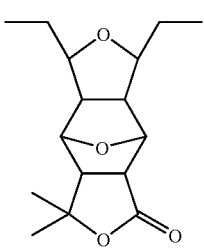

and the like.

Further, regarding the general formula [4], specific examples of $R^{13}$ to $R^{16}$ each independently include a hydrogen atom, or linear, branched or cyclic alkyl group having 1 to 10 carbon atoms such as methyl, ethyl, n-propyl, isopropyl, n-butyl, tert-butyl, cyclohexyl, menthyl and the like. $X^3$ represent —O— or —CR$^{17}$$_2$— (wherein, $R^{17}$ represents a hydrogen atom or a linear or branched alkyl group having 1 to 10 carbon atoms) and when n is 1 to 3, $X^3$s may be the same or different. Specific examples of $R^{17}$ include a hydrogen atom, or a linear or branched alkyl group having 1 to 10 carbon atoms such as methyl, ethyl, n-propyl, isopropyl, n-butyl, tert-butyl and the like. $X^3$ represents preferably —O— or —CH$_2$—, and more preferably, all of $X^3$s are either —O— or —CH$_2$—. One of $Y^1$ and $Y^2$ represents —(C=O)— and the other of $Y^1$ and $Y^2$ represents —CR$^{18}$$_2$— (wherein, $R^{18}$ represents a hydrogen atom or a linear or branched alkyl group having 1 to 10 carbon atoms). Specific examples of $R^{18}$ include a hydrogen atom, or a linear or branched alkyl group having 1 to 10 carbon atoms such as methyl, ethyl, n-propyl, isopropyl, n-butyl, tert-butyl and the like. One of $Y^1$ and $Y^2$ represents preferably —(C=O)— and the other of $Y^1$ and $Y^2$ is —CH$_2$—. n is preferably 0 or 1.

Namely, specific examples of the general formula [4], the structural unit [C] of the chemical formula [4-1] to [4-16]:

[4-1]
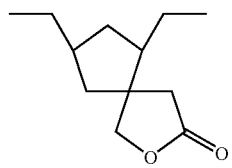

[4-2]
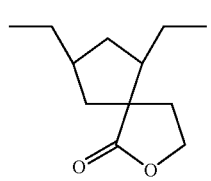

[4-3]
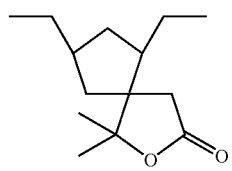

[4-4]
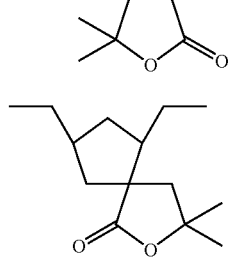

[4-5]
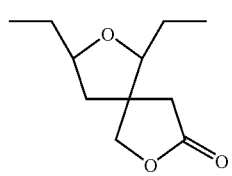

[4-6]
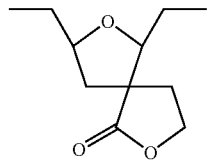

-continued

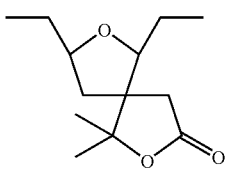 [4-7]

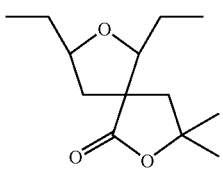 [4-8]

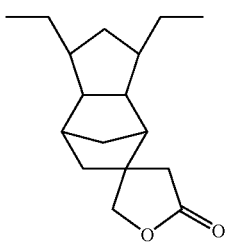 [4-9]

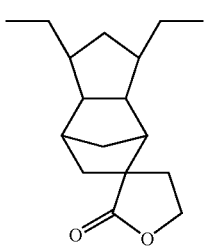 [4-10]

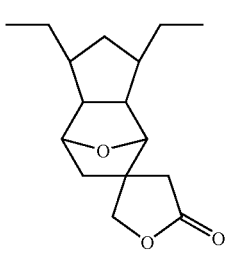 [4-11]

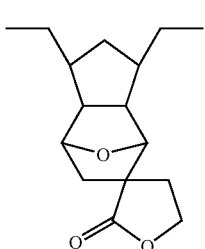 [4-12]

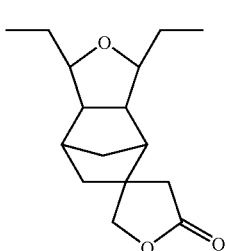 [4-13]

-continued

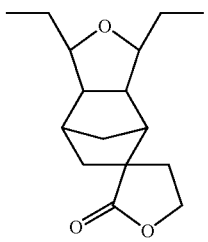 [4-14]

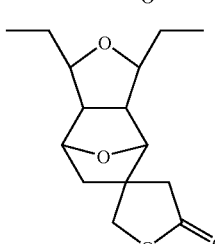 [4-15]

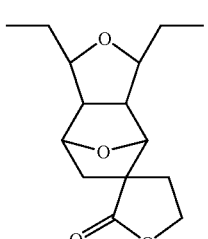 [4-16]

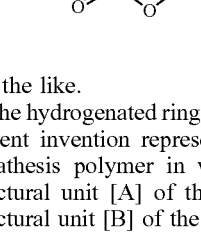

and the like.

The hydrogenated ring-opening metathesis polymer in the present invention represents a hydrogenated ring-opening metathesis polymer in which at least one of $X^1$ in the structural unit [A] of the general formula [1], $X^2$ in the structural unit [B] of the general formula [3] and $X^3$ in the structural unit [C] of the general formula [4] represents —O—, and by such presence of an oxygen atom in the main chain, adhesion to and wet tension in development with an alkali aqueous solution on a substrate to be treated such as a silicon substrate are improved, and solubility in polar organic solvents such as ketones, alcohols and the like used in a process of applying a resist agent onto a silicon wafer is further improved and affinity to water is also improved and developing property with a releasing agent (or a developer) such as an alkali aqueous solution and the like after exposure is also improved. Preferable is a hydrogenated ring-opening metathesis polymer in which at least one of $X^1$ in the structural unit [A] of the general formula [1], $X^2$ in the structural unit [B] of the general formula [3] and $X^3$ in the structural unit [C] of the general formula [4] represents —O— and the others represent —CH$_2$—. The molar amount of the —O— unit based on the total of unit molar amounts of $X^1$, $X^2$ and $X^3$ is 0.01 to 0.99, preferably 0.02 to 0.95, more preferably, 0.05 to 0.80, and most preferably 0.10 to 0.70.

In the present invention, the molar ratio of the structural unit [A] of the general formula [1] to the structural unit [B] of the general formula [3] and/or the structural unit [C] of the general formula [4] ([A]/([B] and [C])) is 0/100 to 99/1, preferably 20/80 to 99/1. It is essential that at least the structural unit [B] and/or [C] is present at a certain amount. Here, the structural unit [A] contains a tertiary ester group of a cyclic alkyl in the general formula [2], namely a group which is decomposed with the action of an acid generated from a sensitizer in exposure, to produce a carboxylic acid and the unit [A] is necessary for making a resist pattern by developing with an alkali aqueous solution after exposure. Further, the structural unit [B] and/or [C] is necessary for manifesting adhesion with a substrate to be treated such as a silicon substrate. When the molar ratio [A]/([B] and [C]) is less than 20/80, development may be insufficient. When the molar ratio is more than 99/1, adhesion with a substrate to be treated is not manifested. The molar ratio [A]/([B] and [C]) is more preferably 20/80 to 95/5, particularly preferably 25/75 to 90/10, and most preferably 30/70 to 85/15. The molar ratio of these structural units within this range is suitable for preparing a resist composition, and is extremely important for a resist material which is dissolved in a polar solvent such as 2-heptanone and the like, for example, together with a sensitizer having high polarity, and applied on a substrate to be treated such as a silicon substrate. Namely, a uniform and smooth coating film can be formed by enhancing solubility or dissolution rate in a polar solvent with the aid of a hydrogenated ring-opening metathesis polymer, in preparing a resist composition.

In the hydrogenated ring-opening metathesis polymer of the present invention, at least one of the structural units [B] and [C] is necessary, and a ternary copolymer constituted of the structural units [B] and [C] in addition to the structural units [A] may be permissible, and preferable is a binary copolymer constituted only one of the structural units [B] and [C] in addition to the structural unit [A].

The present invention provides a hydrogenated ring-opening metathesis polymer wherein the ratio of the weight-average molecular weight Mw to the number-average molecular weight Mn (Mw/Mn) is more than 2.0 and less than 5.0. The hydrogenated ring-opening metathesis polymer of the present invention can lower dependence of polymer solution concentration for non-uniform thickness of a resist coating film in applying the resist film onto a silicon wafer substrate by a spin coater, thereby form a coating film having uniform film thickness without changing conditions for making a film. Therefore, operation conditions such as solution concentration and conditions for spin coating can be broadly set to form a uniform and smooth coating film. On the other hand, if the molecular weight distribution is not more than 2.0, the coating film may have non-uniform thickness when the thickness of the coating film increases at a high solution concentration to be a non-uniform film easily and non-uniform resolution of resist occurs at the sites where the film is thick and where the film is thin. Further, if the molecular weight distribution is not less than 5.0, differences may occur in the dissolution rate into the developer in developing with an alkali solution, thereby non-uniform development may occur and resolution performance may be reduced. By maintaining a molecular weight distribution within the range of the present invention, a coating film of a uniform and smooth resist can be formed regardless of the solution concentration, and a good coating film can be formed under the broad operation condition for making film, while maintaining the resolution performance.

The hydrogenated ring-opening metathesis polymer of the present invention usually has a weight-average molecular weight Mw from 500 to 1,000,000, preferably from 1,000 to 100,000 and particularly preferably, from 3,000 to 50,000. The number-average molecular weight and the weight-average molecular weight described in the present specification were measured by gel permeation chromatography (GPC) in terms of polystyrene.

Further, these hydrogenated ring-opening metathesis polymers may be composed of each one structural unit of [A], [B] and/or [C], or two or more structural units of any of or all of [A], [B] and/or [C]. There are exemplified hydrogenated ring-opening metathesis polymers in which the structural unit [A] is composed of the following general formula [A-1] and [A-2], respectively:

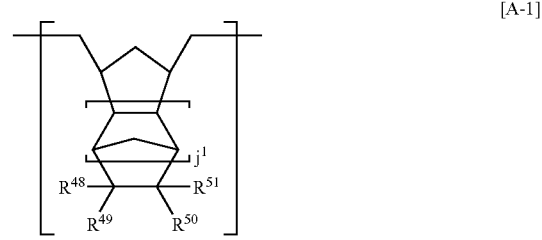

[A-1]

[wherein, at least one of $R^{48}$ to R51 represents a functional group having a tertiary ester group of a cyclic alkyl in the general formula [2] and the remaining groups of $R^{48}$ to $R^{51}$ are selected each independently from a hydrogen atom, a linear, branched or cyclic alkyl group having 1 to 20 carbon atoms, halogens, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $j^1$ represents an integer of 0 or 1 to 3.)

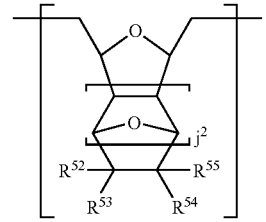

[A-2]

(wherein, at least one of $R^{52}$ to $R^{55}$ represents a functional group having a tertiary ester group of a cyclic alkyl in the general formula [2] and the remaining groups of $R^{52}$ to $R^{55}$ are selected each independently from a hydrogen atom, a linear, branched or cyclic alkyl group having 1 to 20 carbon atoms, halogens, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $j^2$ represents an integer of 0 or 1 to 3.), the structural unit [B] is composed of the following general formula [B-1] and [B-2], respectively:

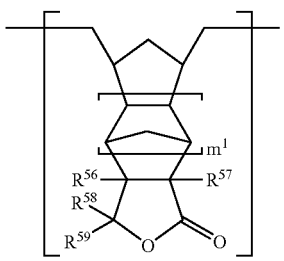

[B-1]

(wherein, $R^{56}$ to $R^{59}$ each independently represent a hydrogen atom or a linear, branched or cyclic alkyl group having 1 to 10 carbon atoms, and $m^1$ represents an integer of 0 or 1 to 3.)

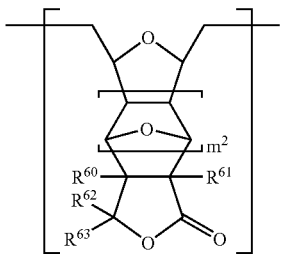

[B-2]

(wherein, $R^{60}$ to $R^{63}$ each independently represent a hydrogen atom or a linear, branched or cyclic alkyl group having 1 to 10 carbon atoms, and $m^2$ represents an integer of 0 or 1 to 3.), and/or the structural unit [C] is composed of the following general formula [C-1] and [C-2], respectively:

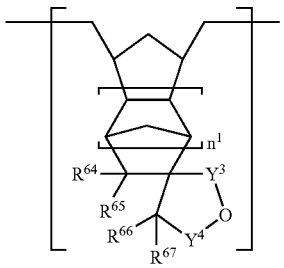

[C-1]

(wherein, $R^{64}$ to $R^{67}$ each independently represent a hydrogen atom or a linear, branched or cyclic alkyl group having 1 to 10 carbon atoms, one of $Y^3$ and $Y^4$ represents —(C=O)— and the other of $Y^3$ and $Y^4$ represents —CH$_2$— and $n^1$ represents an integer of 0 or 1 to 3.)

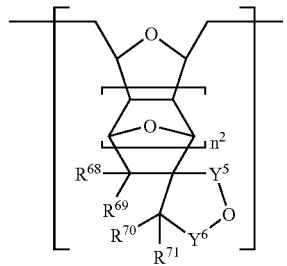

[C-2]

(wherein, $R^{68}$ to $R^{71}$ each independently represent a hydrogen atom or a linear, branched or cyclic alkyl group having 1 to 10 carbon atoms, one of $Y^5$ and $Y^6$ represents —(C=O)— and the other of $Y^5$ and $Y^6$ represents —CH$_2$—, and $n^2$ represents an integer of 0 or 1 to 3.).

It is preferable that the hydrogenated ring-opening metathesis copolymer of the present invention has a structural unit [D] of the general formula [5] further as a structural unit in addition to the structural units [A] and [B] and/or [C], for further improving adhesion to a substrate and affinity to a developer.

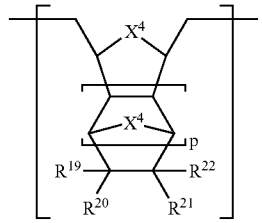

[5]

Regarding the general formula [5] of the present invention, at least one of $R^{19}$ to $R^{22}$ represents a functional group having a carboxyl group of the general formula [6]:

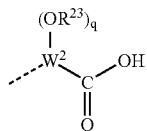

[6]

(wherein, the chain line represents a connecting means. $R^{23}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms. $W^2$ represents a single bond or a (q+2)-valent hydrocarbon group having 1 to 10 carbon atoms. q represents 0 or 1.). Regarding $R^{23}$, examples of the linear, branched or cyclic alkyl group having 1 to 10 carbon atoms includes methyl, ethyl, propyl, isopropyl, n-butyl, isobutyl, tert-butyl, cyclopentyl, cyclohexyl, 1-ethylcyclopentyl, 1-ethylcyclohexyl and the like, examples of the linear, branched or cyclic alkoxyalkyl group having 2 to 10 carbon atoms includes methoxymethyl, 1-ethoxyethyl, 1-tert-butoxyethyl, 1-cyclohexyloxyethyl, 1-ethoxypropyl, 1-ethoxy-1-methylethyl, tetrahydrofuran-2-yl, tetrahydropyran-2-yl and the like, and examples of the linear, branched or cyclic acyl group having 1 to 10 carbon atoms includes formyl, acetyl, pivaloyl, cyclohexylcarbonyl and the like. Among these groups $R^{23}$, a linear or branched alkyl group having 1 to 6 carbon atoms, a linear, branched or cyclic alkoxyalkyl group having 2 to 7 carbon atoms and a linear or branched acyl group having 2 to 7 carbon atoms, particularly, a hydrogen atom, methyl, ethyl, methoxymethyl, 1-ethoxyethyl, tetrahydrofuran-2-yl and acetyl are preferable.

Regarding $W^2$, a (q+2)-valent hydrocarbon group having 1 to 10 carbon atoms is a linear, branched or cyclic divalent hydrocarbon group having 1 to 10 carbon atoms when q is 0, and examples thereof include methylene, dimethylmethylene, ethylidene, propylidene, butylidene, ethylene, 1-methylethylene, 2-methylethylene, 1-ethylethylene, 2-ethylethylene, 1,1-dimethylethylene, 1,2-dimethylethylene, 2,2-dimethylethylene, 1-ethyl-2-methylethylene, trimethylene, 1-methyltrimethylene, 2-methyltrimethylene, 3-methyltrimethylene, tetramethylene, pentamethylene, 1,1-cyclopentylene, 1,2-cyclopentylene, 1,3-cyclopentylene, 1,1-cyclohexylene, 1,2-cyclohexylene, 1,3-cyclohexylene, 1,4-cyclohexylene and the like. Among them, methylene, ethylidene, ethylene, 1-methylethylene, 2-methylethylene, trimethylene and 2-methyltrimethylene are preferable. When q is 1, for example, those having a connecting means formed by removing one hydrogen atom at any position on the hydrocarbon group as described above when q is 0, are listed. Most preferably, $W^2$ represents a single bond.

Regarding the other groups of $R^{19}$ to $R^{22}$, a hydrogen atom, a linear, branched or cyclic alkyl group having 1 to 20 carbon atoms such as methyl, ethyl, propyl, isopropyl, n-butyl, tert-butyl, cyclohexyl, menthyl and the like, halogens such as a chlorine atom, a bromine atom, an iodine atom, a fluorine atom and the like, a linear, branched or cyclic halogenated alkyl group having 1 to 20 carbon atoms such as fluoromethyl, chloromethyl, bromomethyl, difluoromethyl, dichloromethyl, dibromomethyl, trifluoromethyl, trichloromethyl, tribromomethyl and the like, a linear, branched or cyclic alkoxy group having 1 to 12 carbon atoms such as methoxy, ethoxy, isopropoxy, n-butoxy, tert-butoxy, menthoxy and the like, a linear, branched or cyclic alkoxyalkyl group having 2 to 20 carbon atoms such as methoxymethyl, methoxyethyl, tert-butoxymethyl, tert-butoxyethyl, methoxymenthol and the like, or containing alkoxy saccharides such as methylglucose and the like, a linear, branched or cyclic alkylcarbonyloxy group having 2 to 20 carbon atoms such as acetoxy and the like, an arylcarbonyloxy group having 6 to 20 carbon atoms such as naphthoyloxy, a linear, branched or cyclic alkylsulfonyloxy group having 1 to 20 carbon atoms such as mesyloxy and the like, an arylsulfonyloxy group having 6 to 20 carbon atoms such as tosyloxy and the like, a linear, branched or cyclic alkoxycarbonyl group having 2 to 20 carbon atoms such as methoxycarbonyl, ethoxycarbonyl, n-propoxycarbonyl, isopropoxycarbonyl, n-butoxycarbonyl, tert-butoxycarbonyl, cyclohexyloxycarbonyl and the like, and a linear, branched or cyclic alkoxycarbonylalkyl group having 3 to 20 carbon atoms such as methoxycarbonylmethyl, 2-(methoxycarbonyl)ethyl, 1-(methoxycarbonyl)ethyl, ethoxycarbonylmethyl, 2-(ethoxycarbonyl)ethyl, n-propoxycarbonylmethyl, isopropoxycarbonylmethyl, n-butoxycarbonylmethyl, tert-butoxycarbonylmethyl, cyclohexyloxycarbonylmethyl and the like are each independently listed as specific examples thereof. Among these, a hydrogen atom, a linear, branched or cyclic alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkoxycarbonyl group having 2 to 20 carbon atoms and a linear, branched or cyclic alkoxycarbonylalkyl group having 3 to 20 carbon atoms are preferable, and a hydrogen atom, a linear or branched alkyl group having 1 to 10 carbon atoms, a linear or branched alkoxycarbonyl group having 2 to 10 carbon atoms and a linear or branched alkoxycarbonylalkyl group having 3 to 10 carbon atoms are more preferable.

$X^4$ represents —O— or —$CR^{24}{}_2$— (wherein, $R^{24}$ represents a hydrogen atom or a linear or branched alkyl group having 1 to 10 carbon atoms) and when p is 1 to 3, $X^4$s may be the same or different. Specific examples of $R^{24}$ include a hydrogen atom and a linear or branched alkyl group having 1 to 10 carbon atoms such as methyl, ethyl, n-propyl, isopropyl, n-butyl, tert-butyl and the like. $X^4$ represents preferably —O— or —$CH_2$—, and more preferably, all of $X^4$s are either —O— or —$CH_2$—. p is preferably 0 or 1.

Namely, specific examples of the general formula [5] include the structural unit [D] of the chemical formula [5-1] to [5-64]:

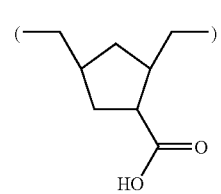

[5-1]

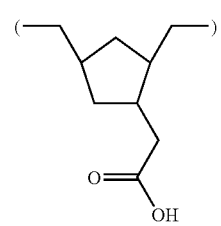

[5-2]

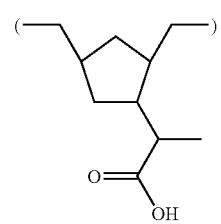

[5-3]

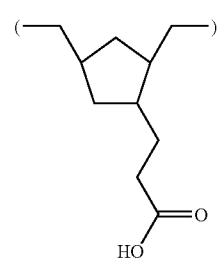

[5-4]

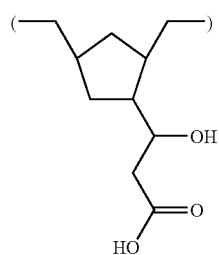 [5-5]
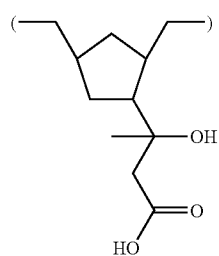 [5-6]
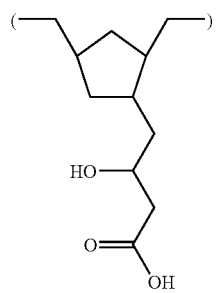 [5-7]
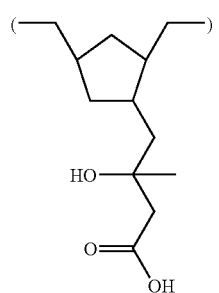 [5-8]
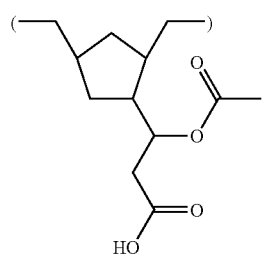 [5-9]
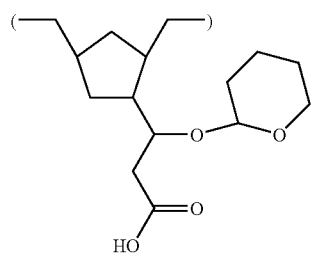 [5-10]
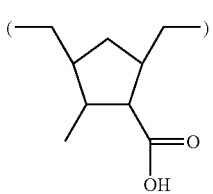 [5-11]
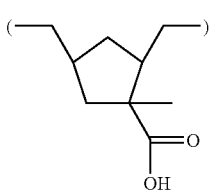 [5-12]
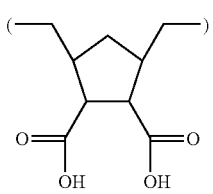 [5-13]
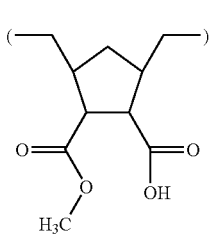 [5-14]
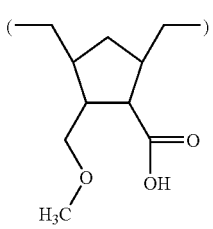 [5-15]
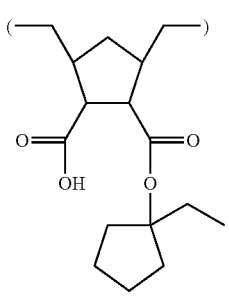 [5-16]
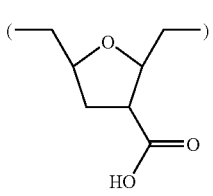 [5-17]

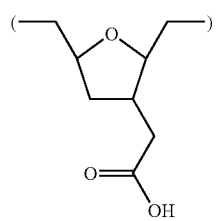
[5-18]
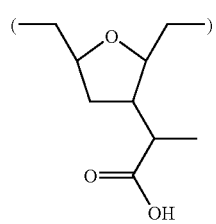
[5-19]
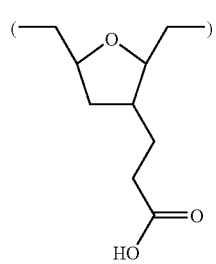
[5-20]
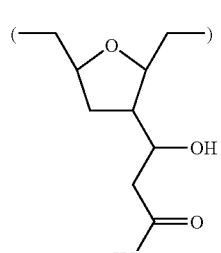
[5-21]
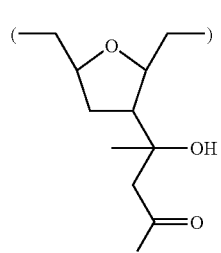
[5-22]
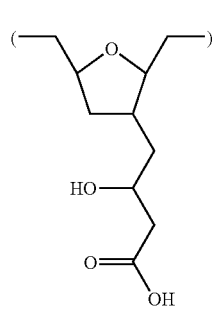
[5-23]
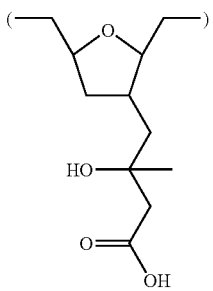
[5-24]
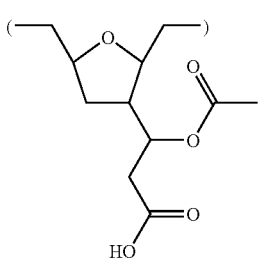
[5-25]
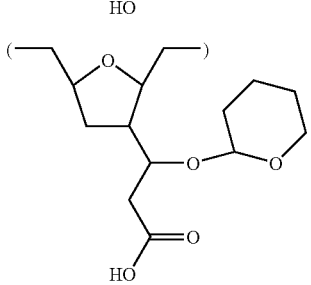
[5-26]
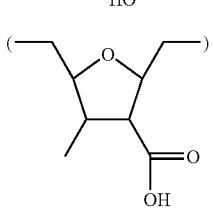
[5-27]
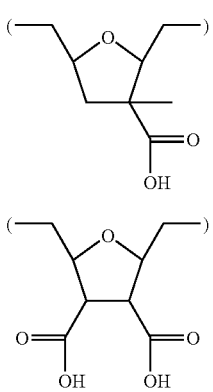
[5-28]
[5-29]
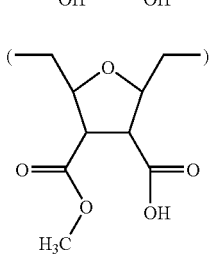
[5-30]

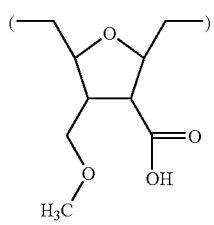
[5-31]
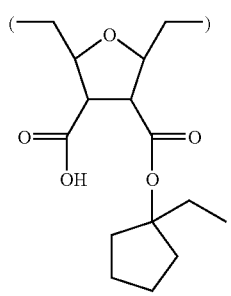
[5-32]
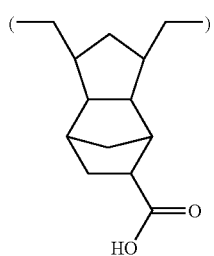
[5-33]
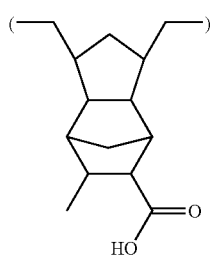
[5-34]
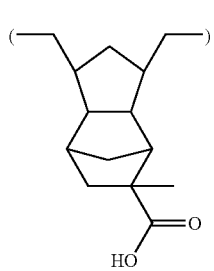
[5-35]
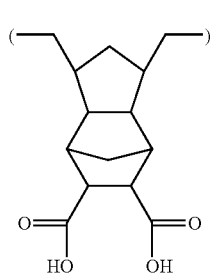
[5-36]
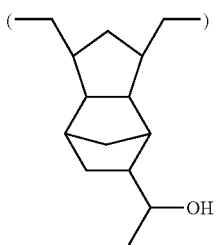
[5-37]
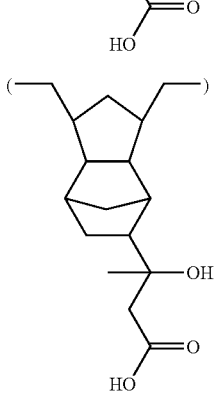
[5-38]
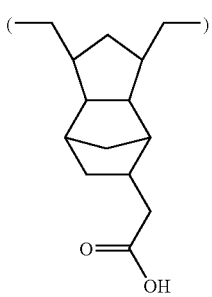
[5-39]
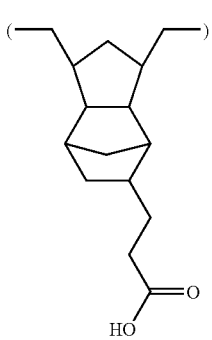
[5-40]
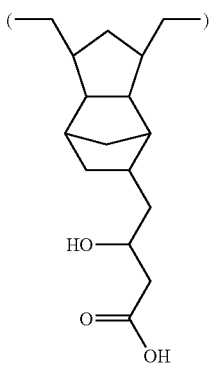
[5-41]

[5-42]
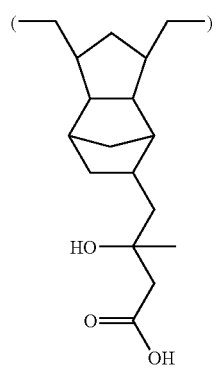
[5-43]
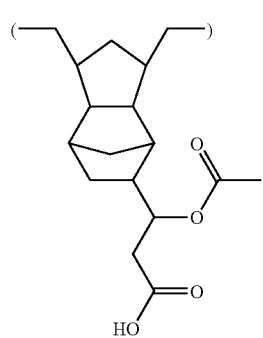
[5-44]
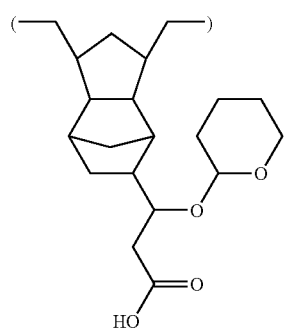
[5-45]
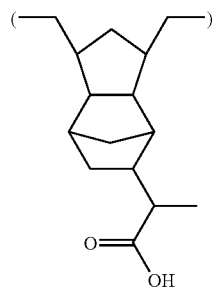
[5-46]
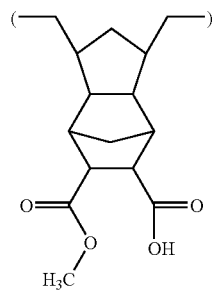
[5-47]
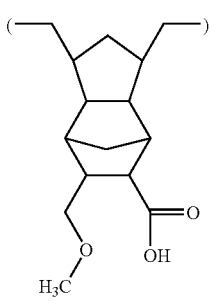
[5-48]
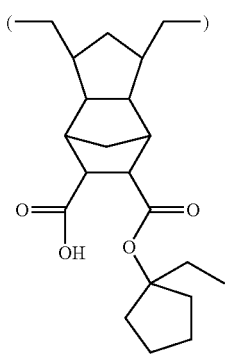
[5-49]
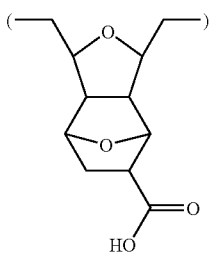
[5-50]
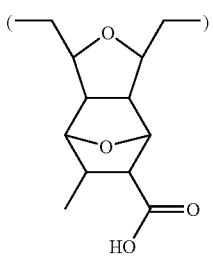
[5-51]
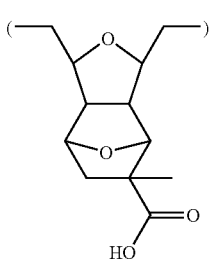

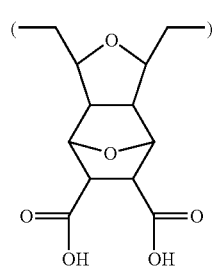 [5-52]
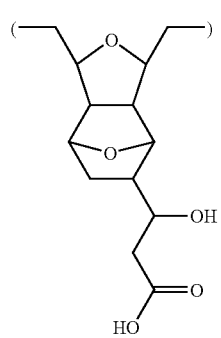 [5-53]
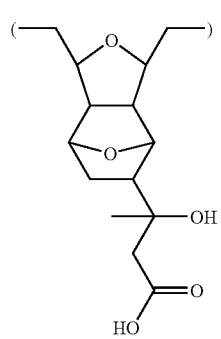 [5-54]
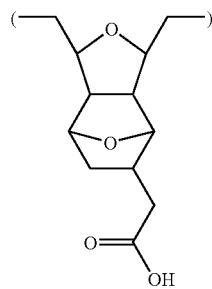 [5-55]
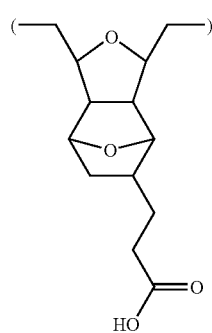 [5-56]
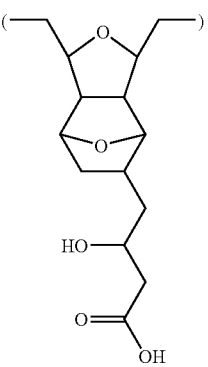 [5-57]
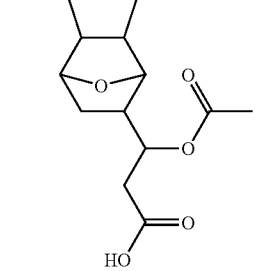 [5-58]
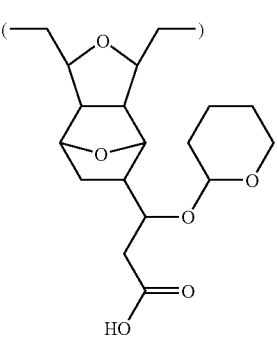 [5-59]
[5-60]

-continued

[5-61]
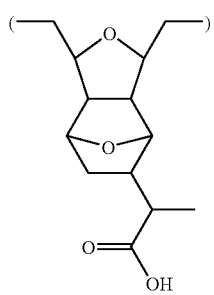

[5-62]
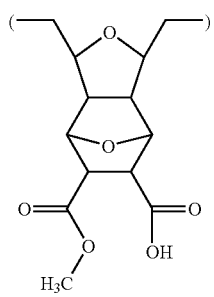

[5-63]
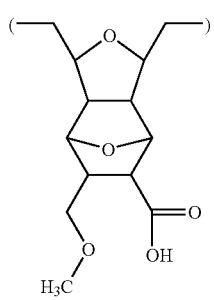

[5-64]
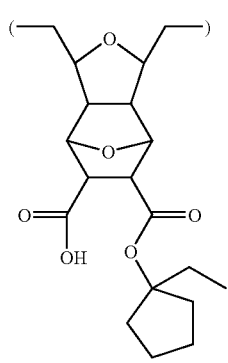

and the like.

In preferable embodiments of the present invention, the molar ratio of the structural unit [A] of the general formula [1], the structural unit [B] of the general formula [3] and the structural unit [C] of the general formula [4] to the structural unit [D] of the general formula [5] (([A]+[B]+[C])/[D]) is from 100/0 to 20/80 and it is preferable that the structural unit [D] is present in a certain amount in addition to the structural units [A], [B] and [C]. Here, the structural unit [D] enhances extremely adhesion to a substrate to be treated such as a silicon substrate, and further improve affinity to a developer. The molar ratio ([A]+[B]+[C])/[D] is preferably from 98/2 to 50/50, further preferably from 97/3 to 60/40, and most preferably from 95/5 to 70/30.

The hydrogenated ring-opening metathesis copolymer of the present invention has a structural unit [E] of the general formula [7] further as a structural unit in addition to the structural units [A] and [B] and/or [C], preferably further in addition to [D].

[7]
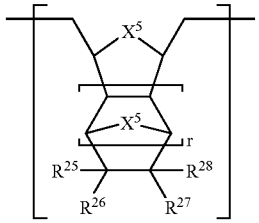

Regarding the general formula [7], at least one of $R^{25}$ to $R^{28}$ represents a functional group having a carboxylic acid ester group of the general formula [8]:

[8]
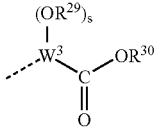

(wherein, the chain line represents a connecting means. $R^{29}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms. $R^{30}$ represents a linear or branched alkyl group having 1 to 10 carbon atoms, a linear, branched or cyclic alkoxyalkyl group having 2 to 10 carbon atoms, or a linear, branched or cyclic halogenated alkyl group having 1 to 20 carbon atoms. $W^3$ represents a single bond or a (s+2)-valent hydrocarbon group having 1 to 10 carbon atoms. s represents 0 or 1.).

Regarding $R^{29}$, examples of the linear, branched or cyclic alkyl group having 1 to 10 carbon atoms includes methyl, ethyl, propyl, isopropyl, n-butyl, isobutyl, tert-butyl, cyclopentyl, cyclohexyl, 1-ethylcyclopentyl, 1-ethylcyclohexyl and the like, examples of the linear, branched or cyclic alkoxyalkyl group having 2 to 10 carbon atoms includes methoxymethyl, 1-ethoxyethyl, 1-tert-butoxyethyl, 1-cyclohexyloxyethyl, 1-ethoxypropyl, 1-ethoxy-1-methylethyl, tetrahydrofuran-2-yl, tetrahydropyran-2-yl and the like, and examples of the linear, branched or cyclic acyl group having 1 to 10 carbon atoms includes formyl, acetyl, pivaloyl, cyclohexylcarbonyl and the like. Among these groups $R^{29}$, a linear or branched alkyl group having 1 to 6 carbon atoms, a linear, branched or cyclic alkoxyalkyl group having 2 to 7 carbon atoms and a linear or branched acyl group having 2 to 7 carbon atoms, and particularly, a hydrogen atom, methyl, ethyl, methoxymethyl, 1-ethoxyethyl, tetrahydrofuran-2-yl and acetyl are preferable.

Regarding $R^{30}$, examples of the linear or branched alkyl group having 1 to 10 carbon atoms includes methyl, ethyl, propyl, isopropyl, n-butyl, isobutyl, tert-butyl and the like, examples of the linear, branched or cyclic alkoxyalkyl group having 2 to 10 carbon atoms includes methoxymethyl, 1-ethoxyethyl, 1-tert-butoxyethyl, 1-cyclohexyloxyethyl, 1-ethoxypropyl, 1-ethoxy-1-methylethyl, tetrahydrofuran-2-yl, tetrahydropyran-2-yl and the like, and examples of the linear, branched or cyclic halogenated alkyl group having 1 to 20 carbon atoms includes fluoromethyl, chloromethyl, bromomethyl, difluoromethyl, dichloromethyl, dibromomethyl, trifluoromethyl, trichloromethyl, tribromomethyl and the like. Among these groups $R^{30}$, a linear or branched alkyl group having 1 to 10 carbon atoms, and particularly, methyl, ethyl, propyl, isopropyl, n-butyl, isobutyl and tert-butyl are preferable.

Regarding $W^3$, the (s+2)-valent hydrocarbon group having 1 to 10 carbon atoms is a linear, branched or cyclic divalent hydrocarbon group having 1 to 10 carbon atoms when s is 0, and examples thereof include methylene, dimethylmethylene, ethylidene, propylidene, butylidene, ethylene, 1-methylethylene, 2-methylethylene, 1-ethylethylene, 2-ethylethylene, 1,1-dimethylethylene, 1,2-dimethylethylene, 2,2-dimethylethylene, 1-ethyl-2-methylethylene, trimethylene, 1-methyltrimethylene, 2-methyltrimethylene, 3-methyltrimethylene, tetramethylene, pentamethylene, 1,1-cyclopentylene, 1,2-cyclopentylene, 1,3-cyclopentylene, 1,1-cyclohexylene, 1,2-cyclohexylene, 1,3-cyclohexylene, 1,4-cyclohexylene and the like. Among them, methylene, ethylidene, ethylene, 1-methylethylene, 2-methylethylene, trimethylene and 2-methyltrimethylene are preferable. When s is 1, for example, those having a connecting means formed by removing one hydrogen atom at any position on the hydrocarbon group as described above when s is 0, are listed. Most preferably, $W^3$ represents a single bond.

Regarding the other groups of $R^{25}$ to $R^{28}$, a hydrogen atom, a linear, branched or cyclic alkyl group having 1 to 20 carbon atoms such as methyl, ethyl, propyl, isopropyl, n-butyl, tert-butyl, cyclohexyl, menthyl and the like, halogens such as a chlorine atom, a bromine atom, an iodine atom, a fluorine atom and the like, a linear, branched or cyclic halogenated alkyl group having 1 to 20 carbon atoms such as fluoromethyl, chloromethyl, bromomethyl, difluoromethyl, dichloromethyl, dibromomethyl, trifluoromethyl, trichloromethyl, tribromomethyl and the like, a linear, branched or cyclic alkoxy group having 1 to 12 carbon atoms such as methoxy, ethoxy, isopropoxy, n-butoxy, tert-butoxy, menthoxy and the like, a linear, branched or cyclic alkoxyalkyl group having 2 to 20 carbon atoms such as methoxymethyl, methoxyethyl, tert-butoxymethyl, tert-butoxyethyl, methoxymenthol and the like, or containing alkoxy saccharides such as methylglucose and the like, a linear, branched or cyclic alkylcarbonyloxy group having 2 to 20 carbon atoms such as acetoxy and the like, an arylcarbonyloxy group having 6 to 20 carbon atoms such as naphthoyloxy, a linear, branched or cyclic alkylsulfonyloxy group having 1 to 20 carbon atoms such as mesyloxy and the like, an arylsulfonyloxy group having 6 to 20 carbon atoms such as tosyloxy and the like, a linear, branched or cyclic alkoxycarbonyl group having 2 to 20 carbon atoms such as methoxycarbonyl, ethoxycarbonyl, n-propoxycarbonyl, isopropoxycarbonyl, n-butoxycarbonyl, tert-butoxycarbonyl, cyclohexyloxycarbonyl and the like, or a linear, branched or cyclic alkoxycarbonylalkyl group having 3 to 20 carbon atoms such as methoxycarbonylmethyl, 2-(methoxycarbonyl)ethyl, 1-(methoxycarbonyl)ethyl, ethoxycarbonylmethyl, 2-(ethoxycarbonyl)ethyl, n-propoxycarbonylmethyl, isopropoxycarbonylmethyl, n-butoxycarbonylmethyl, tert-butoxycarbonylmethyl, cyclohexyloxycarbonylmethyl, are each independently listed as specific examples thereof. Among these, a linear, branched or cyclic alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkoxycarbonyl group having 2 to 20 carbon atoms and a linear, branched or cyclic alkoxycarbonylalkyl group having 3 to 20 carbon atoms are preferable, and a hydrogen atom, a linear or branched alkyl group having 1 to 10 carbon atoms, a linear or branched alkoxycarbonyl group having 2 to 10 carbon atoms and a linear or branched alkoxycarbonylalkyl group having 3 to 10 carbon atoms are more preferable.

$X^5$ represents —O— or —$CR^{31}_2$— (wherein, $R^{31}$ represents a hydrogen atom or a linear or branched alkyl group having 1 to 10 carbon atoms), and when r is 1 to 3, $X^5$ may be the same or different. Specific examples of $R^{31}$ include a hydrogen atom, or a linear or branched alkyl group having 1 to 10 carbon atoms such as methyl, ethyl, n-propyl, isopropyl, n-butyl, tert-butyl and the like. $X^5$ represents preferably —O— or —$CH_2$—, and more preferably, all of $X^5$s are either —O— or —$CH_2$—. r represents preferably 0 or 1.

Namely, specific examples of the general formula [7] include the structural unit [E] of the chemical formula [7-1] to [7-64]:

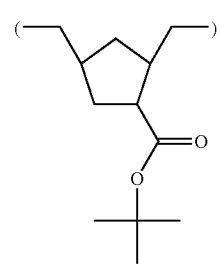

[7-1]

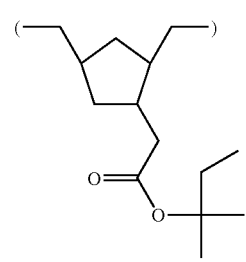

[7-2]

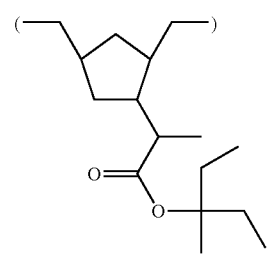

[7-3]

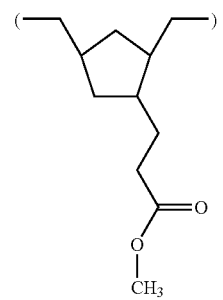

[7-4]

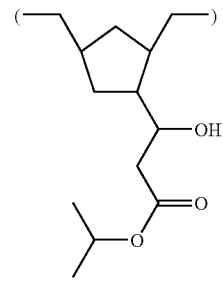

[7-5]

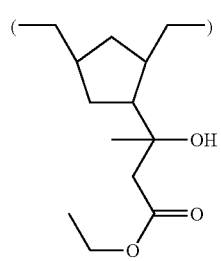 [7-6]
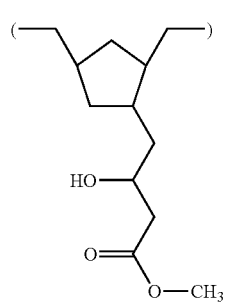 [7-7]
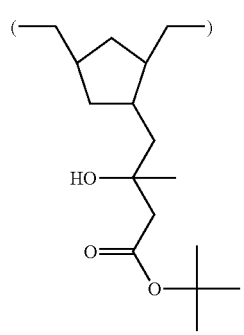 [7-8]
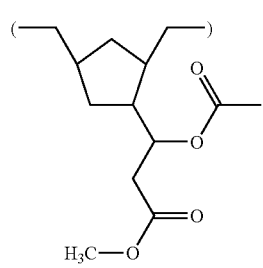 [7-9]
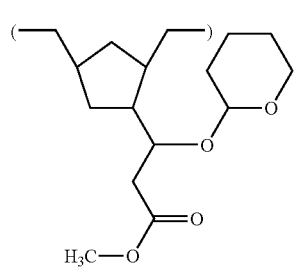 [7-10]
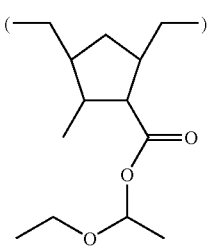 [7-11]
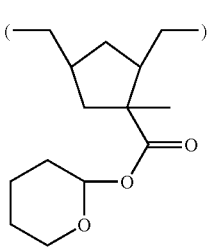 [7-12]
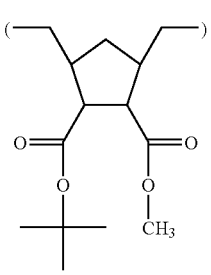 [7-13]
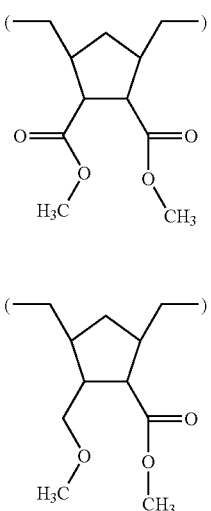 [7-14]
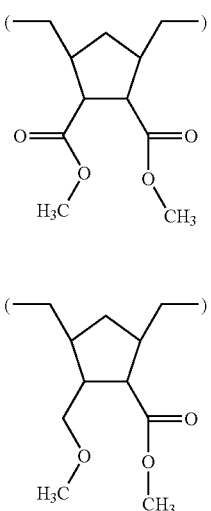 [7-15]
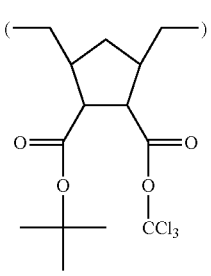 [7-16]

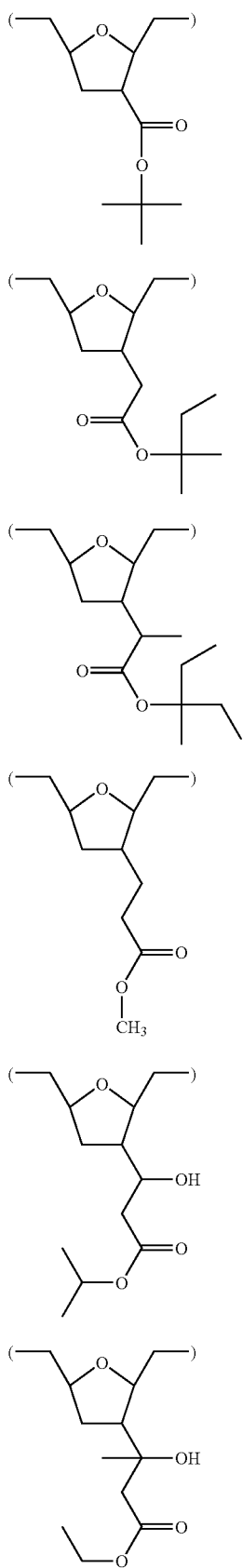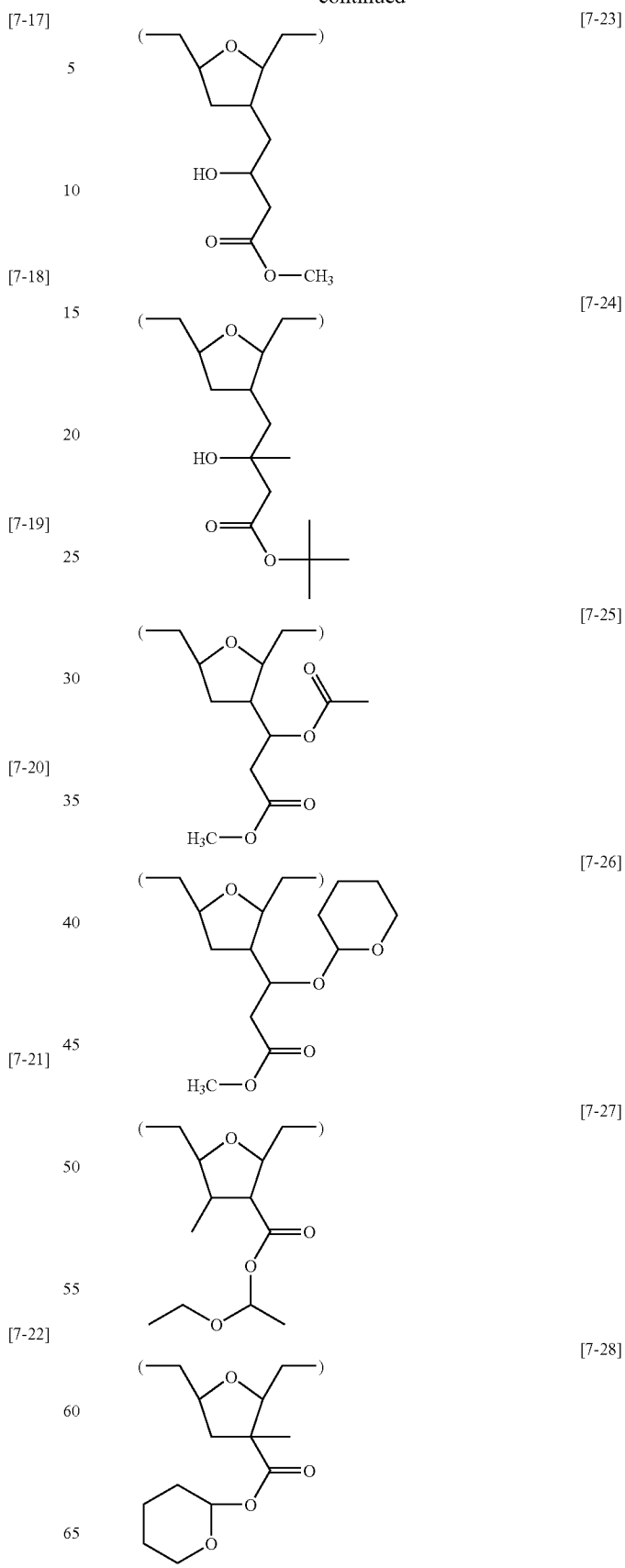

-continued
[7-29]
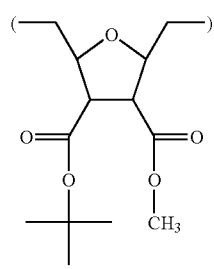
[7-30]
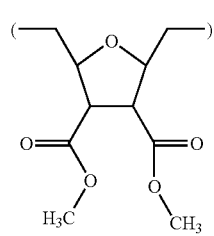
[7-31]
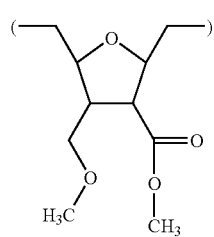
[7-32]
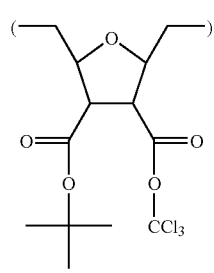
[7-33]
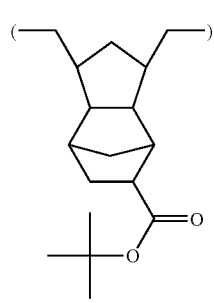
[7-34]
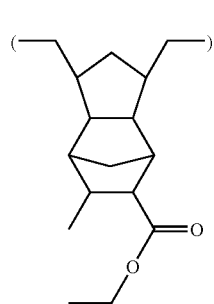
-continued
[7-35]
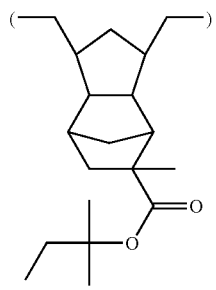
[7-36]
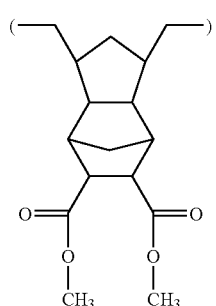
[7-37]
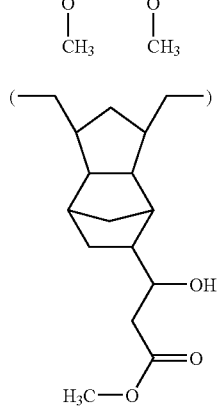
[7-38]
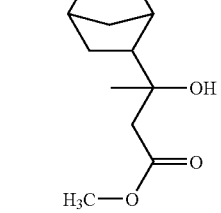
[7-39]
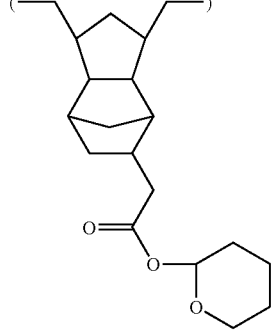

[7-40]
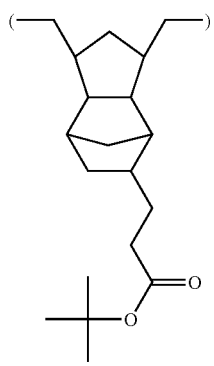
[7-41]
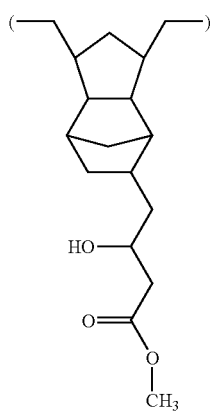
[7-42]
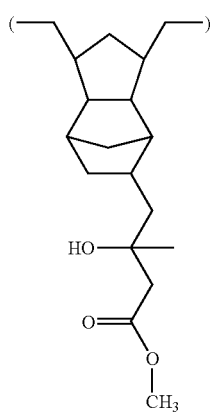
[7-43]
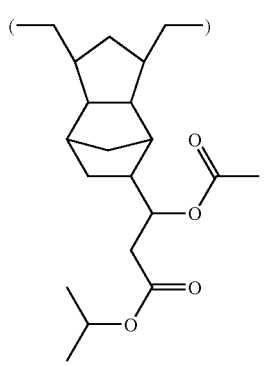
[7-44]
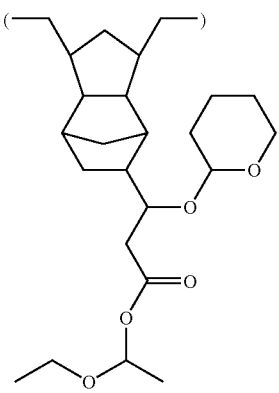
[7-45]
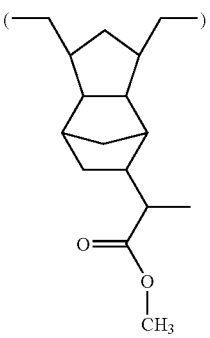
[7-46]
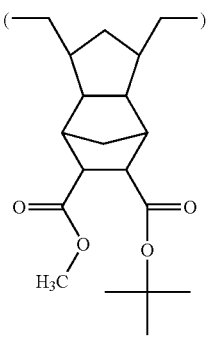
[7-47]
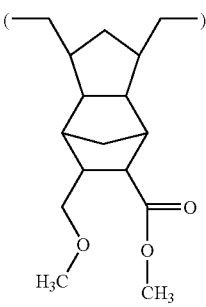

-continued
[7-48]
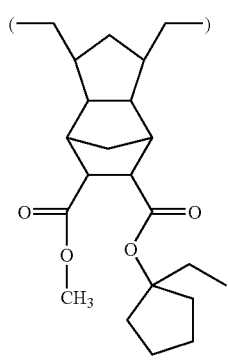
[7-49]
[7-50]
[7-51]
[7-52]
-continued
[7-53]
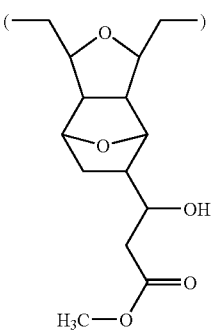
[7-54]
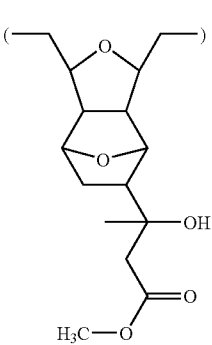
[7-55]
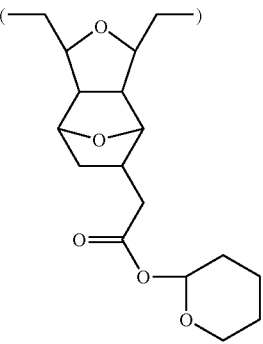
[7-56]
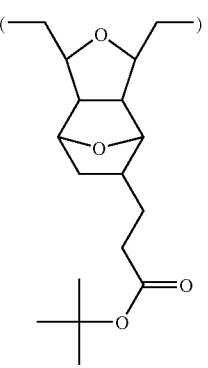

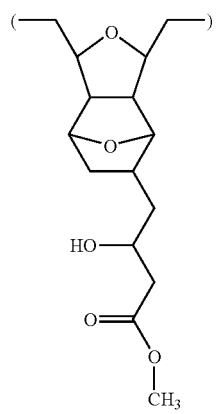
[7-57]
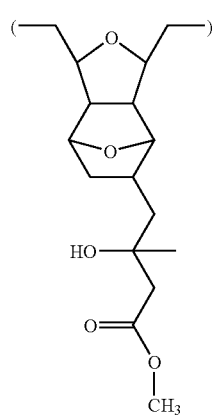
[7-58]
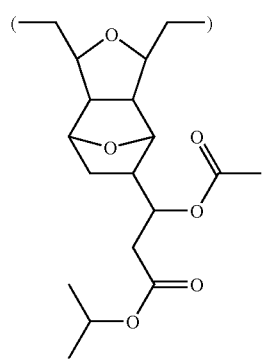
[7-59]
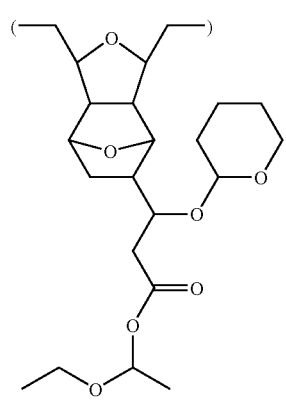
[7-60]
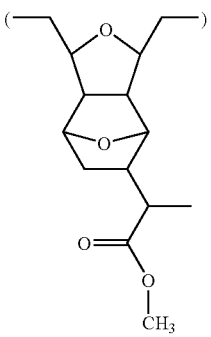
[7-61]
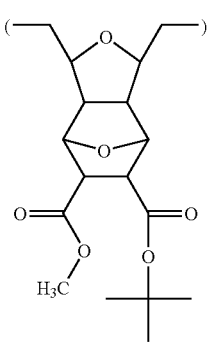
[7-62]
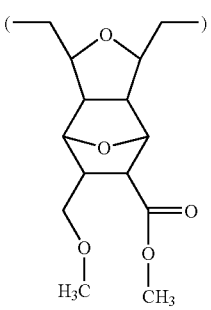
[7-63]
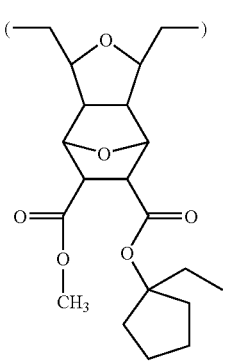
[7-64]
and the like.
The hydrogenated ring-opening metathesis copolymer of the present invention may further has a structural unit [F] of the following general formula [15] as a structural unit in addition to the structural units [A] and [B] and/or [C], preferably in addition to the structural unit [D], and further in addition to the structural unit [E] in some cases:

[15]

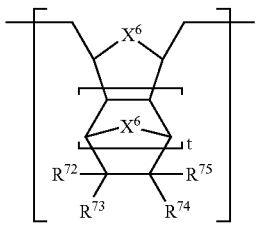

[wherein, $R^{72}$ to $R^{75}$ are selected each independently from a hydrogen atom, a linear, branched or cyclic alkyl group having 1 to 20 carbon atoms, halogens, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a hydroxy group, a linear, branched or cyclic hydroxyalkyl group having 1 to 20 carbon atoms, a cyano group, a linear, branched or cyclic cyanoalkyl group having 2 to 20 carbon atoms, a linear, branched or cyclic alkylcarbonyloxy group having 2 to 20 carbon atoms, a linear, branched or cyclic alkylcarbonyloxyalkyl group having 3 to 20 carbon atoms, an arylcarbonyloxy group having 6 to 20 carbon atoms, a linear, branched or cyclic alkylsulfonyloxy group having 1 to 20 carbon atoms, a linear, branched or cyclic alkylsulfonyloxyalkyl group having 2 to 20 carbon atoms, or an arylsulfonyloxy group having 6 to 20 carbon atoms, and $X^6$s may be same or different and represent —O— or —$CR^{76}{}_2$— (wherein, $R^{76}$ represents a hydrogen atom or a linear or branched alkyl group having 1 to 10 carbon atoms). t represents an integer of 0 or 1 to 3.].

The hydrogenated ring-opening metathesis copolymer of the present invention is obtained by polymerizing cyclic olefin monomers corresponding respectively to the structural unit [A] of the general formula [1], the structural unit [B] of the general formula [3] and/or the structural unit [C] of the general formula [4], and if necessary the structural unit [E] of the general formula [7], and further if necessary the structural unit [F] of the general formula [15] by using a ring-opening metathesis catalyst, and hydrogenating the resulted polymer in the presence of a hydrogenation catalyst.

The cyclic olefin monomer corresponding to the structural unit [A] of the general formula [1] is a cyclic olefin monomer having a structure of the general formula [9], the cyclic olefin monomer corresponding to the structural unit [B] of the general formula [3] is a cyclic olefin monomer having a structure of the general formula [10], the cyclic olefin monomer corresponding to the structural unit [C] of the general formula [4] is a cyclic olefin monomer having a structure of the general formula [11], the cyclic olefin monomer corresponding to the structural unit [E] of the general formula [7] is a cyclic olefin monomer having a structure of the general formula [12]:

[12]

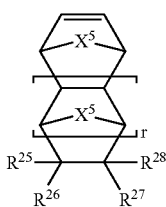

(wherein $R^{25}$ to $R^{28}$, $X^5$ and r are as defined in the general formula [7])

and the cyclic olefin monomer corresponding to the structural unit [F] of the general formula [15] is a cyclic olefin monomer having a structure of the following general formula [16]:

[16]

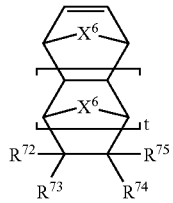

(wherein $R^{72}$ to $R^{75}$, $X^6$ and t are as defined in the general formula [15].).

Specific examples of $R^{48}$ to $R^{75}$ in these formula are substituents described previously as the respective corresponding substituents, and the same substituents including also preferable examples are listed.

Namely, the hydrogenated ring-opening metathesis copolymer of the present invention is obtained by polymerizing at least a cyclic olefin monomer of the general formula [9], a cyclic olefin monomer of the general formula [10] and/or a cyclic olefin monomer of the general formula [11], and if necessary a cyclic olefin monomer of the general formula [12], and further if necessary a cyclic olefin monomer of the general formula [16]; and a cyclic olefin monomer in which at least one of $X^1$ in the general formula [9], $X^2$ in the general formula [10] and $X^3$ in the general formula [11] represents —O—, by using a ring-opening metathesis catalyst, and hydrogenating the resulted polymer in the presence of a hydrogenation catalyst. Preferably, the charging molar ratio of the cyclic olefin monomer of the general formula [9] to a cyclic olefin monomer of the general formula [10] and a cyclic olefin monomer of the general formula [11] is from 0/100 to 99/1, preferably from 20/80 to 99/1, more preferably from 20/80 to 95/5, particularly preferably from 25/75 to 90/10, and most preferably from 30/70 to 85/15. When a cyclic olefin monomer of the general formula [12] is used, it is used usually in an amount of 50 mol % or less, preferably 30 mol % or less, further preferably 20 mol % or less based on the total molar amount of olefin monomers used. When a cyclic olefin monomer of the general formula [16] is used, it is used usually in an amount of 50 mol % or less, preferably 30 mol % or less, further preferably 20 mol % or less based on the total molar amount of olefin monomers used.

Further, it is preferable that at least one of $X^1$ in a cyclic olefin monomer of the general formula [9], $X^2$ in a cyclic olefin monomer of the general formula [10] and $X^3$ in a cyclic olefin monomer of the general formula [11] represents —O— and the others represent —$CH_2$—, and the molar amount of a —O— unit based on the total unit molar amount of $X^1$, $X^2$ and $X^3$ is from 0.01 to 0.99, preferably from 0.02 to 0.95, more preferably from 0.05 to 0.80, and most preferably from 0.10 to 0.70. And in the case where cyclic olefin monomers of the general formula [12] and/or the general formula [16] are used, the molar amount of a —O— unit based on the total unit molar amount of $X^1$, $X^2$, $X^3$, $X^5$ and $X^6$ is from 0.01 to 0.99, preferably from 0.02 to 0.95, more preferably from 0.05 to 0.80, and most preferably from 0.10 to 0.70.

The hydrogenated ring-opening metathesis copolymer of the present invention is obtained by polymerizing the above-mentioned olefin monomers by using a ring-opening metathesis catalyst, preferably a living ring-opening metathesis catalyst, more preferably in the presence of a chain transfer agent such as an olefin, diene and the like, in a solvent or without using a solvent, then hydrogenating the resulted polymer using a hydrogenation catalyst in a solvent under pressure of hydrogen.

The polymerization catalyst used in the present invention may be any catalyst, provided that it causes ring-opening metathesis polymerization, and specific examples of the living ring-opening metathesis catalyst include tungsten-based alkylidene catalysts such as $W(N-2,6-Pr^i_2C_6H_3)(CHBu^t)(OBu^t)_2$, $W(N-2,6-Pr^i_2C_6H_3)(CHBu^t)(OCMe_2CF_3)_2$, $W(N-2,6-Pr^i_2C_6H_3)(CHBu^t)(OCMe(CF_3)_2)_2$, $W(N-2,6-Pr^i_2C_6H_3)(CHCMe_2Ph)(OBu^t)_2$, $W(N-2,6-Pr^i_2C_6H_3)(CHCMe_2Ph)(OCMe_2CF_3)_2$, $W(N-2,6-Pr^i_2C_6H_3)(CHCMe_2Ph)(OCMe(CF_3)_2)_2$ (wherein, $Pr^i$ represents an iso-propyl group, $Bu^t$ represents a tert-butyl group, Me represents a methyl group, and Ph represents a phenyl group.) and the like, tungsten-based alkylidene catalysts such as $W(N-2,6-Me_2C_6H_3)(CHCHCMePh)(OBu^t)_2(PMe_3)$, $W(N-2,6-Me_2C_6H_3)(CHCHCMe_2)(OBu^t)_2(PMe_3)$, $W(N-2,6-Me_2C_6H_3)(CHCHCPh_2)(OBu^t)_2(PMe_3)$, $W(N-2,6-Me_2C_6H_3)(CHCHCMePh)(OCMe_2(CF_3))_2(PMe_3)$, $W(N-2,6-Me_2C_6H_3)(CHCHCMe_2)(OCMe_2(CF_3))_2(PMe_3)$, $W(N-2,6-Me_2C_6H_3)(CHCHCPh_2)(OCMe_2(CF_3))_2(PMe_3)$, $W(N-2,6-Me_2C_6H_3)(CHCHCMe_2)(OCMe(CF_3)_2)_2(PMe_3)$, $W(N-2,6-Me_2C_6H_3)(CHCHCPh_2)(OCMe(CF_3)_2)_2(PMe_3)$, $W(N-2,6-Pr^i_2C_6H_3)(CHCHCMePh)(OCMe_2(CF_3))_2(PMe_3)$, $W(N-2,6-Pr^i_2C_6H_3)(CHCHCMePh)(OCMe(CF_3)_2)_2(PMe_3)$, $W(N-2,6-Pr^i_2C_6H_3)(CHCHCMePh)(OPh)_2(PMe_3)$ (wherein, $Pr^i$ represents an iso-propyl group, $Bu^t$ represents a tert-butyl group, Me represents a methyl group, and Ph represents a phenyl group.) and the like, molybdenum-based alkylidene catalysts such as $Mo(N-2,6-Pr^i_2C_6H_3)(CHBu^t)(OBu^t)_2$, $Mo(N-2,6-Pr^i_2C_6H_3)(CHBu^t)(OCMe_2CF_3)_2$, $Mo(N-2,6-Pr^i_2C_6H_3)(CHBu^t)(OCMe(CF_3)_2)_2$, $Mo(N-2,6-Pr^i_2C_6H_3)(CHCMe_2Ph)(OBu^t)_2$, $Mo(N-2,6-Pr^i_2C_6H_3)(CHCMe_2Ph)(OCMe_2CF_3)_2$, $Mo(N-2,6-Pr^i_2C_6H_3)(CHCMe_2Ph)(OCMe(CF_3)_2)_2$ (wherein, $Pr^i$ represents an iso-propyl group, $Bu^t$ represents a tert-butyl group, Me represents a methyl group, and Ph represents a phenyl group.) and the like, rhenium-based alkylidene catalysts such as $Re(CBu^t)(CHBu^t)(O-2,6-Pr^i_2C_6H_3)_2$, $Re(CBu^t)(CHBu^t)(O-2-Bu^tC_6H_4)_2$, $Re(CBu^t)(CHBu^t)(OCMe_2CF_3)_2$, $Re(CBu^t)(CHBu^t)(OCMe(CF_3)_2)_2$, $Re(CBu^t)(CHBu^t)(O-2,6-Me_2C_6H_3)_2$ (wherein, $Bu^t$ represents a tert-butyl group.) and the like, tantalum-based alkylidene catalysts such as $Ta[C(Me)C(Me)CHCMe_3](O-2,6-Pr^i_2C_6H_3)_3Py$, $Ta[C(Ph)C(Ph)CHCMe_3](O-2,6-Pr^i_2C_6H_3)_3Py$ (wherein, Me represents a methyl group, Ph represents a phenyl group, and Py represents a pyridine group.) and the like, ruthenium-based alkylidene catalysts such as $Ru(CHCHCPh_2)(PPh_3)_2Cl_2$, $Ru(CHCHCPh_2)(P(C_6H_{11})_3)_2Cl_2$ (wherein, Ph represents a phenyl group.) and the like, and titanacyclobutane catalysts.

Further, in addition to the above-mentioned catalysts, there can also be used living ring-opening metathesis catalysts obtained by combining an organic transition metallic complex with a Lewis acid as a co-catalyst, for example, ring-opening metathesis catalysts composed of a transition metal halogen complex containing molybdenum, tungsten and the like and, an organoaluminum compound, an organotin compound or an organometallic compound containing lithium, sodium, magnesium, zinc, cadmium, boron and the like, as a co-catalyst. Further, there can also be used ring-opening metathesis catalysts obtained by combining a known transition metallic halide with the Lewis acid as a co-catalyst.

Specific examples of the organic transition metallic halogen complex include catalysts obtained by combining organometallic compounds described below with tungsten-based halogen complexes such as $W(N-2,6-Pr^i_2C_6H_3)(thf)(OBu^t)_2Cl_2$, $W(N-2,6-Pr^i_2C_6H_3)(thf)(OCMe_2CF_3)_2Cl_2$, $W(N-2,6-Pr^i_2C_6H_3)(thf)(OCMe(CF_3)_2)_2Cl_2$, $W(N-2,6-Me_2C_6H_3)(thf)(OBu^t)_2Cl_2$, $W(N-2,6-Me_2C_6H_3)(thf)(OCMe_2CF_3)_2Cl_2$, $W(N-2,6-Me_2C_6H_3)(thf)(OCMe(CF_3)_2)_2Cl_2$ (wherein, $Pr^i$ represents an iso-propyl group, $Bu^t$ represents a tert-butyl group, Me represents a methyl group, Ph represents a phenyl group, and thf represents tetrahydrofuran.) and the like, and catalysts obtained by combining organometallic compounds described below with molybdenum-based halogen complexes such as $Mo(N-2,6-Pr^i_2C_6H_3)(thf)(OBu^t)_2Cl_2$, $Mo(N-2,6-Pr^i_2C_6H_3)(thf)(OCMe_2CF_3)_2Cl_2$, $Mo(N-2,6-Pr^i_2C_6H_3)(thf)(OCMe(CF_3)_2)_2Cl_2$, $Mo(N-2,6-Me_2C_6H_3)(thf)(OBu^t)_2Cl_2$, $Mo(N-2,6-Me_2C_6H_3)(thf)(OCMe_2CF_3)_2Cl_2$, $Mo(N-2,6-Me_2C_6H_3)(thf)(OCMe(CF_3)_2)_2Cl_2$ (wherein, $Pr^i$ represents an iso-propyl group, $Bu^t$ represents a tert-butyl group, Me represents a methyl group, Ph represents a phenyl group, and thf represents tetrahydrofuran.) and the like, and catalysts obtained by organometallic compounds described below with $WCl_6$, $WOCl_4$, $ReCl_5$, $TiCl_4$, $RuCl_3$, $IrCl_3$ and the like.

Further, specific examples of the organometallic compounds as a co-catalyst include organoaluminum compounds such as trimethylaluminum, triethylaluminum, triisobutylaluminum, trihexylaluminum, trioctylaluminum, triphenylaluminum, tribenzylaluminum, diethylaluminum monochloride, di-n-butylaluminum, diethylaluminum monobromide, diethylaluminum monoiodide, diethylaluminum monohydride, ethylaluminum sesquichloride, ethylaluminum dichloride and the like, organic tin compounds such as tetramethyltin, diethyldimethyltin, tetraethyltin, dibutyldiethyltin, tetrabutyltin, tetraoctyltin, trioctyltin fluoride, trioctyltin chloride, trioctyltin bromide, trioctyltin iodide, dibutyltin difluoride, dibutyltin dichloride, dibutyltin dibromide, dibutyltin diiodide, butyltin trifluoride, butyltin trichloride, butyltin tribromide, butyltin triiodide and the like, organic lithium compounds such as n-butyl lithium and the like, organic sodium compounds such as n-pentyl sodium and the like, organic magnesium compounds such as methyl magnesium iodide, ethyl magnesium bromide, methyl magnesium bromide, n-propyl magnesium bromide, t-butyl magnesium chloride, allyl magnesium chloride and the like, organic zinc compounds such as diethyl zinc and the like, organic cadmium compounds such as diethyl cadmium and the like, organic boron compounds such as trimethylboron, triethylboron, tri-n-butylboron and the like.

Regarding the molar ratio of a cyclic olefin-based monomer to a ring-opening metathesis catalyst in the living ring-opening metathesis polymerization of the present invention, the molar ratio of a cyclic olefin-based monomer to a transition metal alkylidene complex is from 2 to 50000, preferably from 10 to 10000, in the case of a transition metal alkylidene catalyst containing tungsten, molybdenum, rhenium, tantalum, ruthenium and the like, or a titanacyclobutane catalyst. In the case of a ring-opening metathesis catalyst composed of an organic transition metal halogen complex and an organometallic compound, the molar ratio of a cyclic olefin-based monomer to an organic transition metal halogen complex is from 2 to 50000, preferably from 10 to 10000 and the molar ratio of an organometallic compound as a co-catalyst to an organic transition metal halogen complex is from 0.1 to 100, preferably from 1 to 50.

When polymerization is conducted by using a ring-opening metathesis catalyst in the present invention, it is preferable to effect the polymerization in the presence of a chain transfer agent such as an olefin, diene and the like, for enhancing catalyst efficiency. Further, such chain transfer agent is used for controlling the molecular weight to obtain a polymer having a desired molecular weight. Examples of the olefin used as a chain transfer agent include α-olefins such as ethylene, propylene, butene, pentene, hexane, octane and the like, and silicon-containing olefins such as vinyltrimethylsilane, allyltrimethylsilane, allyltriethylsilane, allyltriisopropylsilane and the like. The diene includes non-conjugated dienes such as 1,4-pentadiene, 1,5-hexadiene 1,6-heptadiene and the like. Further, these olefins or dienes may be used alone or in combination of two or more.

Regarding the amount used of an olefin or diene allowed to co-exist in the present invention, the amount of an olefin or diene is from 0.001 to 1000-fold mol, preferably from 0.01 to 100-fold mol based on cyclic olefin-based monomers. Further, the amount of an olefin or diene is from 0.1 to 1000 equivalents, preferably from 1 to 500 equivalents based on 1 equivalent of an alkylidene in a transition metal alkylidene complex. A desired size of the molecular weight can be obtained by arbitrarily adjusting the amount ratio.

To produce the hydrogenated ring-opening metathesis polymer of the present invention which has such molecular weight distribution that the ratio of the weight-average molecular weight Mw to the number-average molecular weight Mn(Mw/Mn)is more than 2.0 and less than 5.0, the molecular weight distribution should be broaden in the step of polymerization, but it was not possible with a conventional method, particularly, a method using a complex catalyst of the living polymerization catalyst. Further, in spite of batch polymerization with one kind of a living polymerization catalyst under the coexistence of a chain transfer agent, obtained was a polymer having a molecular weight distribution within probability distributions of the chain transfer reaction, with a relatively narrow distribution.

In the present invention, (1) a cyclic olefin monomer is polymerized with a ring-opening metathesis polymerization catalyst through at least 2 steps to produce a polymer component of high molecular weight and a polymer component of low molecular weight and then hydrogenated in the presence of a hydrogenation catalyst to produce a hydrogenated ring-opening metathesis polymer having a broad molecular weight distribution. Alternatively, (2) a cyclic olefin monomer is polymerized under the coexistence of at least 2 kinds of the polymerization catalysts to produce a polymer component of high molecular weight and a polymer component of low molecular weight and then hydrogenated in the presence of a hydrogenation catalyst to produce a hydrogenated ring-opening metathesis polymer having a broad molecular weight distribution.

In the present invention, the ratio of the weight-average molecular weight of the polymer component of high molecular weight (HMw) to the weight-average molecular weight of the polymer component of low molecular weight (LMw) is not less than 2 (HMw/LMw≧2). Further, regarding the proportion of the polymer component of high molecular weight and the polymer component of low molecular weight in terms of the weight-average molecular weight represents, the proportion of at least one of them is 10 to 90% by weight, preferably, 20 to 80% by weight.

The method of polymerizing a cyclic olefin monomer through at least 2 steps as described in (1) is carried out by a method in which chain transfer agents are sequentially introduced into the polymerization reaction system through at least 2 steps, a method in which the living polymerization catalyst is introduced into the polymerization reaction system through at least 2 steps, a method in which a cyclic olefin monomer is introduced through at least 2 steps, or a method in which polymerization temperature is changed through at least 2 steps, or a combination thereof. The size of molecular weight produced by such methods depends on the reactivity of three of the living polymerization catalysts, the cyclic olefin monomer and the chain transfer agent, and the size of the molecular weight of the polymer is determined by the amount ratio of the cyclic olefin monomer or the amount ratio of the chain transfer agent to the polymerization catalyst, or the amount ratio of the cyclic olefin monomer to the chain transfer agent. By conducting such methods with any different time intervals through at least 2 steps, the weight-average molecular weight size of the polymer obtained in each step polymerization and the ratio of each polymer can be determined. Regarding the polymerization proportion of each step in the case where the cyclic olefin monomer is polymerized through at least 2 steps, the polymerization proportion of at least one step is 10 to 90% by weight, preferably 20 to 80% by weight.

The method of polymerizing a cyclic olefin monomer through under the coexistence of at least 2 kinds of the polymerization catalyst as described in (2), is a method using a combination of a catalyst for obtaining a polymer component of high molecular weight and a catalyst for obtaining a polymer component of low molecular weight, wherein the size of molecular weight produced is determined by the polymerization reactivity of the polymerization catalyst for the cyclic olefin monomer or the chain transfer property for a chain transfer agent. The combination of the polymerization catalysts is selected from such polymerization catalysts that the ratio of the weight-average molecular weight of the polymer component obtained by a catalyst for polymerizing a high molecular weight polymer (HMw) to the weight-average molecular weight of the polymer component obtained by the catalyst for polymerizing a low molecular weight polymer (LMw) is not less than 2 (HMw/LMw≧2). Such polymerization reactivity and chain transfer property, namely, polymerization reaction rate and controllability for molecular weight depend on insertability of the polymerization catalyst into the cyclic olefin monomer and stability after the insertion. Therefore, they depend on the kinds of a transition metal of the polymerization catalyst and the kinds of the ligands which donate the electrons to the metallic atom or draw the electrons. For example, it is recognized that the catalysts having the same kinds of the ligands have the different polymerization reactivity and the chain transfer property if the kinds of the metal are different since the outermost electron density of the catalyst itself is different. Using such properties, the polymers of high molecular weight and of low molecular weight can be produced under the same conditions by selecting a combination of at least 2 kinds of the catalysts among the living polymerization catalysts. The size of the molecular weight of the polymer is determined by the amount ratio of a cyclic olefin monomer or the amount ratio of a chain transfer agent, relative to each of the selected polymerization catalysts, and the amount ratio of a cyclic olefin monomer to a chain transfer agent. A proportion of the polymer components can be produced by changing the amount of each polymerization catalyst. A polymerization proportion of each of the selected catalysts is suitably determined such that the polymerization proportion of at least one kind of the catalysts is 10 to 90% by weight, preferably, 20 to 80% by weight.

Further, the ring-opening metathesis polymerization of the present invention may be effected using a solvent or without using a solvent. The particularly used solvent includes ethers such as tetrahydrofuran, diethylether, dibutylether, dimethoxyethane, dioxane and the like, aromatic hydrocarbons such as benzene, toluene, xylene, ethylbenzene and the like, aliphatic hydrocarbons such as pentane, hexane, heptane and the like, alicyclic hydrocarbons such as cyclopentane, cyclohexane, methylcyclohexane, dimethylcyclohexane, decalin and the like, and halogenated hydrocarbons such as methylene dichloride, dichloroethane, dichloroethylene, tetrachloroethane, chlorobenzene, trichlorobenzene and the like, and these may be used in a mixture of two or more.

The concentration of ring-opening metathesis polymerization in the present invention is not uniform and varies depending on the reactivity of a cyclic olefin-based monomer, the solubility into a polymerization solvent and the like but usually the concentration of a cyclic olefin-based monomer in a solvent is from 0.001 to 500 mol/L, preferably from 0.01 to 100 mol/L, further preferably from 0.05 to 50 mol/L. Also the reaction temperature varies depending on the kind and amount of a cyclic olefin-based monomer and ring-opening metathesis catalyst and the like but usually from −30 to 150° C., preferably from 0 to 120° C., further preferably from 15 to 100° C. The reaction time is usually from 1 minute to 10 hours, preferably from 5 minutes to 8 hours, further preferably from 10 minutes to 6 hours.

After polymerization reaction, the reaction can be terminated with a de-activating agent such as aldehydes such as butyraldehyde and the like, ketones such as acetone and the like, alcohols such as methanol and the like, to obtain a ring-opening metathesis polymer solution.

In the present invention, a polymer having a desired molecular weight can be obtained by controlling the molar ratio of a monomer to a catalyst since the ring-opening metathesis polymerization for obtaining the polymer is conducted according to a living polymerization reaction. Alternatively, a polymer having a desired molecular weight can be obtained also by controlling the molar ratio of a monomer, a chain transfer agent and a catalyst while keeping the living polymerization reaction by conducting a living ring-opening metathesis polymerization in the presence of an olefin or diene as a chain transfer agent. The polymer obtained by this living polymerization has a weight-average molecular weight Mw in terms of polystyrene of from 500 to 1,000,000, preferably from 1,000 to 100,000, particularly from 3,000 to 50,000.

As described above, a ring-opening metathesis polymer having an olefinically unsaturated bond in the main chain part having broad molecular weight distribution is obtained by polymerizing a cyclic olefin monomer of the present invention using a ring-opening metathesis catalyst. In the present invention, it is necessary to hydrogenate an olefin in the main chain part of a ring-opening metathesis polymer to increase the UV transmittance to the maximum extent in this range particularly against a region of ArF excimer laser having a wavelength of 193 nm, for lowering the region of the ultraviolet (UV) maximum absorption wavelength. In this hydrogenation reaction, a known hydrogenation catalyst can be used. Therefore, the resist material having a hydrogenated ring-opening metathesis polymer having a broad molecular weight distribution can have a broad range of the conditions to obtain a uniform film and have improved film-making properties for a silicon wafer substrate as a resist film.

Specific examples of the hydrogenation catalyst include supporter type metal catalysts prepared by supporting a metal such as palladium, platinum, nickel, rhodium, ruthenium and the like on a carrier such as carbon, silica, alumina, titania, magnesia, diatomaceous earth, synthetic zeolite and the like as heterogeneous catalysts, and nickel naphthenate/triethylaluminum, nickel acetylacetonate/triisobutylaluminum, cobalt octenoate/n-butyllithium, titanocene dichloride/diethylaluminum chloride, rhodium acetate, dichlorobis(triphenylphosphine)palladium, chlorotris(triphenylphosphine)rhodium, dihydride tetrakis(triphenylphosphine)ruthenium and the like as homogeneous catalysts. Further, hydrogenation can also be conducted using a hydrogenation catalyst composed of an amine compound and an organometallic complex of the following general formula [17]:

$$MH_wQ_xT_yU_z \qquad [17]$$

(wherein, M represents ruthenium, rhodium, osmium, iridium, palladium, platinum or nickel, H represents a hydrogen atom, Q represents a halogen atom, T represents CO, NO, toluene, acetonitrile or tetrahydrofuran, U represents an organophosphorus compound represented by $PR^{i1}R^{i2}R^{i3}$ (wherein, P represents phosphorus, and $R^{i1}$, $R^{i2}$ and $R^{i3}$ may be the same or different and each independently represent linear, branched or cyclic alkyl, alkenyl, aryl, alkoxy or allyloxy.), w represents an integer of 0 or 1, x represents an integer of 1 to 3, y represents an integer of 0 or 1, and z represents an integer of 2 to 4.] in the presence of hydrogen as a homogeneous catalyst.

Q in the general formula [17] represents a halogen atom, and specific examples thereof include chlorine, fluorine, bromine and iodine atoms. Further, T represents CO, NO, toluene, acetonitrile or tetrahydrofuran, U represents an organophosphorus compound and specific examples thereof include trimethylphosphine, triethylphosphine, triisopropylphosphine, tri-n-propylphosphine, tri-t-butylphosphine, triisobutylphosphine, tri-n-butylphosphine, tricyclohexylphosphine, triphenylphosphine, methyldiphenylphosphine, dimethylphenylphosphine, tri-o-tolylphosphine, tri-m-tolylphosphine, tri-p-tolylphosphine, diethylphenylphosphine, dichloro(ethyl)phosphine, dichloro(phenyl)phosphine, chlorodiphenylphosphine, trimethylphosphite, triisopropylphosphite and triphenylphosphite.

Specific examples of the organometallic complex of the general formula [17] include
dichlorobis(triphenylphosphine)nickel,
dichlorobis(triphenyiphosphine)palladium,
dichlorobis(triphenylphosphine)platinum,
chlorotris(triphenylphosphine)rhodium,
dichlorotris(triphenylphosphine)osmium,
dichlorohydridebis(triphenylphosphine)iridium,
dichlorotris(triphenylphosphine)ruthenium,
dichlorotetrakis(triphenylphosphine)ruthenium,
trichloronitrosylbis(triphenylphosphine)ruthenium,
dichlorobis(acetonitrile)bis(triphenylphosphine)ruthenium,
dichlorobis(tetrahydrofuran)bis(triphenylphosphine)ruthenium,
chlorohydride(toluene)tris(triphenylphosphine)ruthenium,
chlorohydridecarbonyltris(triphenylphosphine)ruthenium,
chlorohydridecarbonyltris(diethylphenylphosphine)ruthenium,
chlorohydridenitrosyltris(triphenylphosphine)ruthenium,
dichlorotris(trimethylphosphine)ruthenium,
dichlorotris(triethylphosphine)ruthenium,
dichlorotris(tricyclohexylphosphine)ruthenium,
dichlorotris(triphenylphosphine)ruthenium,
dichlorotris(trimethyldiphenylphosphine)ruthenium,
dichlorotris(tridimethylphenylphosphine)ruthenium,
dichlorotris(tri-o-tolylphosphine)ruthenium,
dichlorotris(dichloroethylphosphine)ruthenium, dichlorotris(dichlorophenylphosphine)ruthenium, dichlorotris(trimethylphosphite)ruthenium, dichlorotris(triphenylphosphite)ruthenium and the like.

Further, specific examples of the amine compounds include primary amine compounds such as methylamine, ethylamine, aniline, ethylenediamine, 1,3-diaminocyclobutane and the like, secondary amine compounds such as dimethylamine, methylisopropylamine, N-methylaniline and the like and tertiary amine compounds such as trimethylamine, triethylamine, triphenylamine, N,N-dimethylaniline, pyridine, γ-picoline and the like, and a tertiary amine compound is preferably used. The hydrogenating rate is remarkably improved particularly by using triethylamine.

These organometallic complexes and amine compounds can be respectively used in combination of two or more at any ratio.

In the case where a known hydrogenation catalyst is used for hydrogenating a ring-opening metathesis polymer in the present invention, the amount of the known hydrogenation catalyst is from 5 to 50000 ppm, preferably from 100 to 1000 ppm based on the ring-opening metathesis polymer. When a hydrogenation catalyst composed of an organometallic complex and an amine compound is used, the amount of the organometallic complex is from 5 to 50000 ppm, preferably from 10 to 10000 ppm, particularly preferably from 50 to 1000 ppm based on the ring-opening metathesis polymer. Further, the amount of an amine compound is from 0.1 to 1000 equivalents, preferably from 0.5 to 500 equivalents, particularly preferably from 1 to 100 equivalents based on the organometallic complex to be used.

A hydrogenation catalyst composed of an organometallic complex and an amine compound can be treated previously by contacting an organometallic complex with an amine compound before use, however, they may be added directly to a reaction system, without previously contact treatment of an organometallic complex and an amine compound.

The solvent used in hydrogenating of a ring-opening metathesis polymer may be any solvent provided that it is usually used in a hydrogenation reaction and a solvent which dissolves a ring-opening metathesis polymer and hydrogenated material thereof and is not hydrogenated itself is preferable. Examples thereof include ethers such as tetrahydrofuran, diethyl ether, dibutyl ether, dimethoxyethane and the like, aromatic hydrocarbons such as benzene, toluene, xylene, ethylbenzene and the like, aliphatic hydrocarbons such as pentane, hexane, heptane and the like, alicyclic hydrocarbons such as cyclopentane, cyclohexane, methylcyclohexane, dimethylcyclohexane, decalin and the like, halogenated hydrocarbons such as methylene dichloride, dichloroethane, dichloroethylene, tetrachloroethane, chlorobenzene, trichlorobenzene and the like, and these may be used in a mixture of two or more.

The concentration of a ring-opening metathesis polymer of the present invention in a hydrogenation reaction is not uniform and varies depending on the kinds of a ring-opening metathesis polymer, a hydrogenation catalyst and a solvent but usually the concentration of a ring-opening metathesis polymer in a solvent is from 0.01 g to 10 kg/L, preferably from 0.1 g to 5 kg/L, further preferably from 0.5 g to 1 kg/L.

The hydrogenation reaction of a ring-opening metathesis polymer is conducted under a hydrogen pressure of usually from a normal pressure to 30 MPa, preferably from 0.5 to 20 MPa, particularly preferably from 2 to 15 MPa. The reaction temperature is usually from 0 to 300° C., preferably from room temperature to 250° C., particularly preferably from 50 to 200° C. The reaction time is usually from 1 minute to 50 hours, preferably from 10 minutes to 20 hours, further preferably from 30 minutes to 10 hours.

In production of a hydrogenated ring-opening metathesis polymer in the present invention, a ring-opening metathesis polymer can be isolated from a ring-opening metathesis polymer solution before re-dissolution into a solvent, however a method can also be adopted in which the hydrogenation reaction is conducted by adding a hydrogenation catalyst composed of the above-mentioned organometallic complex and amine compound without isolating the ring-opening metathesis polymer.

After the completion of a ring-opening metathesis polymerization or hydrogenation reaction, a ring-opening metathesis catalyst or a hydrogenation catalyst remaining in a polymer can be removed by a known method. The method includes, for example, filtration, an adsorption method using an adsorbing agent, a method in which an organic acid such as lactic acid and the like, a poor solvent and water are added to a solution containing a good solvent and this system is removed by extraction at normal temperature or under heat, further a method in which a solution containing a good solvent or a polymer slurry is subjected to a contact treatment with a basic compound and an acidic compound, then removed by washing and other methods.

A method of recovering a hydrogenated polymer from a solution of a hydrogenated ring-opening metathesis polymer is not particularly restricted, and known methods can be adopted. The method includes, for example, a filtration method in which a reaction solution is discharged into a poor solvent under stirring to coagulate a hydrogenated polymer, a centrifugal separation method, a method of recovering by a decantation method and the like, a steam stripping method in which steam is blown into a reaction solution to precipitate a hydrogenated polymer, a method of directly removing a solvent from a reaction solution by heating and the like and other methods.

When a hydrogenating method in the present invention is used, hydrogenating rates of 90% or more can be easily attained and hydrogenating rates of 95% or more, particularly of 99% or more are possible and thus obtained cyclic olefin-based hydrogenated ring-opening metathesis polymer is not easily oxidized and an excellent hydrogenated ring-opening metathesis polymer is obtained.

The above-mentioned methods can produce a hydrogenated ring-opening metathesis polymer which contains, if necessary, a structural unit [A] of the general formula [1], contains at least a structural unit [B] of the general formula [3] and/or a structural unit [C] of the general formula [4], and if necessary a structural unit [E] of the general formula [7], and further if necessary a structural unit [F] of the general formula [15] and in which at least one of $X^1$ in the structural unit [A] of the general formula [1], $X^2$ in the structural unit [B] of the general formula [3] and $X^3$ in the structural unit [C] of the general formula [4] represents —O—, the constituting molar ratio of [A]/([B] and [C]) is 0/100 to 99/1, preferably 20/80 to 99/1 and the ratio of the weight-average molecular weight Mw to the number-average molecular weight Mn (Mw/Mn) is more than 2.0 and less than 5.0.

Further, in the present invention, at least part of a tertiary ester group of a cyclic alkyl in the general formula [2] and/or an ester group in the general formula [8] in a hydrogenated ring-opening metathesis polymer obtained as described above is decomposed and converted to a carboxylic acid, to produce a hydrogenated ring-opening metathesis polymer which contains a structural unit [A] of the general formula [1] and, a structural unit [B] of the general formula [3]

and/or a structural unit [C] of the general formula [4], a structural unit [D] of the general formula [5], and if necessary a structural unit [E] of the general formula [7], and further if necessary a structural unit [F] of the general formula [15] and in which at least one of $X^1$ in the structural unit [A] of the general formula [1], $X^2$ in the structural unit [B] of the general formula [3] and $X^3$ in the structural unit [C] of the general formula [4] represents —O—, the constituting molar ratio of [A]/([B] and [C]) is 20/80 to 99/1 and the ratio of the weight-average molecular weight Mw to the number-average molecular weight Mn (Mw/Mn) is more than 2.0 and less than 5.0.

As the method of decomposing at least part of a tertiary ester group of a cyclic alkyl in the general formula [2] and/or an ester group in the general formula [8] to convert it into a carboxylic acid, a method using hydrolysis and/or a method using acidolysis can be usually used, and as the method using hydrolysis, any of acidic hydrolysis conducted in the presence of an acidic catalyst such as sulfuric acid, hydrochloric acid, nitric acid, toluenesulfonic acid, trifluoroacetic acid, acetic acid and the like, alkaline hydrolysis conducted in the presence of an alkaline catalyst such as sodium hydroxide, potassium hydroxide, barium hydroxide and the like and neutral hydrolysis using sodium acetate, lithium iodide and the like instead of an acid or alkali can be used. The method using hydrolysis essentially requires the presence of water in the system and the amount of water used is not less than the molar amount equivalent to that of an ester group to be converted into a carboxylic acid and preferably 5-fold mol or more, further preferably 10-fold mol or more, and most preferably 20-fold mol or more. In the method using acidolysis, acids such as sulfuric acid, hydrochloric acid, nitric acid, toluenesulfonic acid, trifluoroacetic acid, acetic acid and the like can be used. In the method using acidolysis, water may be present in the system though the presence of water is not essential. The amount of the acid catalyst, alkaline catalyst and neutral hydrolysis catalyst used in the method by hydrolysis and the acid used in the method by acidolysis is usually 50 mol or less, preferably from 0.00001 to 30 mol, further preferably from 0.001 to 10 mol based on 1 mol of an ester group to be converted into a carboxylic acid.

The hydrolysis reaction and acidolysis reaction in the method of the present invention may use a water solvent or an organic solvent, and particularly examples of the organic solvent to be used include alcohols such as methanol, ethanol and the like, ketones such as acetone and the like, ethers such as tetrahydrofuran, diethyl ether, dibutyl ether, dimethoxyethane, dioxane and the like, aromatic hydrocarbons such as benzene, toluene, xylene, ethylbenzene and the like, aliphatic hydrocarbons such as pentane, hexane, heptane, cyclohexane and the like, carboxylic acids such as acetic acid and the like, nitro compounds such as nitromethane and the like, pyridines such as pyridine, lutidine and the like, formamides such as dimethylformamide and the like, and these may be mixed with water or alcohols, or only the organic solvents may be used. Further, two or more among them may be mixed and used. The reaction temperature is usually from 0 to 300° C., preferably from room temperature to 250° C., more preferably from room temperature to 200° C. The reaction time is usually from 1 minute to 100 hours, preferably from 5 minutes to 30 hours, more preferably from 10 minutes to 20 hours.

Embodiments of the hydrolysis reaction and acidolysis reaction in the method of the present invention are not particularly restricted, and any embodiment is permissible provided that the hydrolysis reaction and acidolysis reaction can be carried out effectively, and any embodiments under an inert gas atmosphere such as nitrogen and the like, under an air atmosphere, or at reduced pressure, normal pressure, increased pressure, or by batch type, semi-batch type or continuous type may be admitted.

Further, after the completion of the hydrolysis reaction or acidolysis reaction, neutralization treatment may be effected appropriately with an alkali or acid. The method of recovering a polymer from a solution or slurry of a hydrogenated ring-opening metathesis polymer after the hydrolysis reaction or acidolysis reaction, is not particularly restricted and known methods can be used. For example, in the case of a solution, a method in which a reaction solution is discharged into a poor solvent under stirring to precipitate a hydrogenated polymer forming a slurry and the polymer is recovered by a filtration method, a centrifugal separation method, a decantation method and the like, a steam stripping method in which steam is blown into a reaction solution to precipitate a polymer, a method of directly removing a solvent from a reaction solution by heating and the like are listed, and in the case of a slurry, a method of recovering a polymer from a slurry itself by a filtration method, a centrifugal separation method, a decantation method and the like, and other recovering method are listed.

The above-mentioned methods can produce a hydrogenated ring-opening metathesis polymer which contains, if necessary, a structural unit [A] of the general formula [1], contains a structural unit [B] of the general formula [3] and/or a structural unit [C] of the general formula [4], a structural unit [D] of the general formula [5], and if necessary a structural unit [E] of the general formula [7], and further if necessary a structural unit [F] of the general formula [15] and in which at least one of $X^1$ in the structural unit [A] of the general formula [1], $X^2$ in the structural unit [B] of the general formula [3] and $X^3$ in the structural unit [C] of the general formula [4] represents —O—, the constituting molar ratio of [A]/([B] and [C]) is 0/100 to 99/1, preferably 20/80 to 99/1 and the ratio of the weight-average molecular weight Mw to the number-average molecular weight Mn (Mw/Mn) is more than 2.0 and less than 5.0.

Further, in the present invention, a hydrogenated ring-opening metathesis polymer which contains, if necessary, a structural unit [A] of the general formula [1] and, contains a structural unit [B] of the general formula [3] and/or a structural unit [C] of the general formula [4], if necessary a structural unit [D] of the general formula [5], and further if necessary a structural unit [E] of the general formula [7], furthermore if necessary a structural unit [F] of the general formula [15] and in which at least one of $X^1$ in the structural unit [A] of the general formula [1], $X^2$ in the structural unit [B] of the general formula [3] and $X^3$ in the structural unit [C] of the general formula [4] represents —O—, the constituting molar ratio of [A]/([B] and [C]) is 0/100 to 99/1, preferably 20/80 to 99/1 and the ratio of the weight-average molecular weight Mw to the number-average molecular weight Mn (Mw/Mn) is more than 2.0 and less than 5.0, can be produced by converting a carboxylic acid functional group of the hydrogenated ring-opening metathesis polymer having a carboxylic acid functional group obtained as described above, into an ester.

As the method of converting a carboxylic acid functional group into an ester, conventional methods can be applied. For example, esterification by a dehydrocondensation reaction with alcohols, esterification by using an ortho-alkylating agent, esterification by addition of olefins in the presence of an acid, esterification by a condensation reaction with a halide using an organic basic compound, alkoxyalkyl esterification by addition of alkyl vinyl ethers and the like are listed. The method further includes a method of converting a carboxylic acid into an acid halide by using thionyl chloride and the like and then esterifying the acid halide by contacting it with alcohols, a method of contacting a metal salt of the carboxylic acid with a halide and esterifying, and the like.

As alcohols used in the esterification by a dehydrocondensation reaction with alcohols, any alcohols usually used in esterification can be used, and aliphatic alcohols such as methanol, ethanol, 1-propanol, 2-propanol, 1-butanol, 2-butanol, tert-butanol, 1-pentanol, tert-amylalcohol, 3-methyl-3-pentanol, 3-ethyl-3-pentanol, cyclopentanol, cyclopentanemethanol, 1-methylcyclopentanol, 1-ethylcyclopentanol, cyclohexanol, cyclohexylmethanol, dicyclohexylmethanol, tricyclohexylmethanol, 1-methylcyclohexanol, norborneol, 1-adamantanol, 2-adamantanol, 2-methyl-2-adamantanol, 1-adamantanemethanol and the like are preferable. The amount of the alcohol is usually 100 mol or less, preferably from 1 to 50 mol, further preferably from 2 to 30 mol based on 1 mol of a carboxylic acid to be converted into an ester. The esterification by a dehydrocondensation reaction with alcohol is usually conducted in the presence of the acid, and examples of such an acid include hydrogen halides such as a hydrogen chloride gas and the like, mineral acids such as sulfuric acid, phosphoric acid, hydrochloric acid, hydrobromic acid and the like, solid acids such as heteropolyacid, Nafion® and the like, organic acids such as p-toluenesulfonic acid, trifluoroacetic acid, propionic acid, malonic acid, oxalic acid, chlorosulfonic acid-pyridine salt, trifluoroacetic acid-pyridine salt, sulfuric acid-pyridine salt, p-toluenesulfonic acid-pyridine salt and the like, Lewis acids such as boron-trifluoride etherate and the like. The amount of the acid is usually 10 mol or less, preferably from 0.00001 to 2 mol, further preferably from 0.001 to 0.5 based on 1 mole of a carboxylic acid to be converted into an ester. Further, there can also be used a method using an acidic ion exchange resin, a method of effecting solvent-reflux using a Soxhlet extraction apparatus containing a drying agent such as anhydrous magnesium sulfate, molecular sieve and the like, a method of allowing a dehydrating agent such as DCC and the like to co-exist, a method using an extremely surplus amount of alcohol and other methods.

As the alkylating agent used in the esterification by an ortho-alkylating agent, any alkylating agents usually used in esterification of a carboxylic acid can be used, and for example, diazoalkanes such as diazomethane and the like, or trialkyl orthocarboxylates such as triethyl orthoformate, trimethyl orthoacetate and the like are preferable. The amount of the alkylating agent is usually 50 mol or less, preferably from 1 to 30 mol, further preferably from 2 to 20 mol based on 1 mol of a carboxylic acid to be converted into an ester.

As the olefins used in the esterification by addition of olefins in the presence of an acid, any olefins usually used in esterification can be used, and for example, aliphatic alkenes such as 2-methylpropene, 2-methyl-1-butene, 2-ethyl-1-butene, 2-methyl-2-butene, 3-methyl-2-pentene, 1-methyl-1-cyclopentene, 1-methyl-1-cyclohexene, methylenecyclopentane, methylenecyclohexane, ethylidenecyclohexane and the like are preferable. The amount of the olefins is usually 100 mol or less, preferably from 1 to 50 mol, further preferably from 2 to 30 mol based on 1 mol of a carboxylic acid to be converted into an ester. The esterification by addition of olefins is conducted in the presence of the acid, and examples of such an acid include hydrogen halides such as a hydrogen chloride gas and the like, mineral acids such as sulfuric acid, phosphoric acid, hydrochloric acid, hydrobromic acid and the like, solid acids such as heteropolyacid, Nafion® and the like, organic acids such as p-toluenesulfonic acid, trifluoroacetic acid, propionic acid, malonic acid, oxalic acid, chlorosulfonic acid-pyridine salt, trifluoroacetic acid-pyridine salt, sulfuric acid-pyridine salt, p-toluenesulfonic acid-pyridine salt and the like, Lewis acids such as boron-trifluoride etherate and the like. The amount of the acid is usually 10 mol or less, preferably from 0.00001 to 2 mol, further preferably from 0.001 to 0.5 based on 1 mole of a carboxylic acid to be converted into an ester.

As the alkyl vinyl ethers used in the alkoxyalkylesterification by addition of alkyl vinyl ethers, alkoxy-substituted, non-substituted or cyclic alkyl vinyl ethers such as methyl vinyl ether, ethyl vinyl ether, n-propyl vinyl ether, isopropyl vinyl ether, n-butyl vinyl ether, sec-butyl vinyl ether, tert-butyl vinyl ether, isooctyl vinyl ether, decyl vinyl ether, dodecyl vinyl ether, cyclohexyl vinyl ether, 2-ethylhexyl vinyl ether, tert-pentyl vinyl ether, octadecyl vinyl ether, cesyl vinyl ether, 2-methoxyethyl vinyl ether, vinyl-2-(2-ethoxyethoxy)ethyl ether, ethylene glycol butyl vinyl ether, tert-amyl vinyl ether, or 2,3-dihydrofuran, 3,4-dihydro-2H-pyrane, 1,4-dioxene and the like are preferable. Further among them, ethyl vinyl ether, n-propyl vinyl ether, isopropyl vinyl ether, n-butyl vinyl ether, 2,3-dihydrofuran and 3,4-dihydro-2H-pyrane are more preferable. The amount of the alkyl vinyl ethers is usually 50 mol or less, preferably from 1 to 30 mol, further preferably from 2 to 20 mol based on 1 mol of a carboxylic acid to be converted into an ester.

The alkoxyalkylesterification by addition of alkyl vinyl ethers is conducted usually in the presence of the acid, and examples of such an acid include hydrogen halides such as a hydrogen chloride gas and the like, mineral acids such as sulfuric acid, phosphoric acid, hydrochloric acid, hydrobromic acid and the like, solid acids such as heteropolyacid, Nafion® and the like, organic acids such as p-toluenesulfonic acid, trifluoroacetic acid, propionic acid, malonic acid, oxalic acid, chlorosulfonic acid-pyridine salt, trifluoroacetic acid-pyridine salt, sulfuric acid-pyridine salt, p-toluenesulfonic acid-pyridine salt and the like, and among them, a hydrogen chloride gas, hydrochloric acid, trifluoroacetic acid, trifluoroacetic acid-pyridine salt, p-toluenesulfonic acid-pyridine salt and sulfuric acid-pyridine salt are preferably used. These acids can be used alone or in combination of two or more and simultaneously or sequentially. The amount of the acid catalysts is usually 10 mol or less, preferably from 0.00001 to 2 mol, further preferably from 0.001 to 0.5 based on 1 mole of a carboxylic acid to be converted into an ester.

In the method of converting a carboxylic acid functional group into an ester in the method of the present invention, a solvent is usually used. The solvents differ depending on the method used and the kind of the intended ester and the like, and any of a water solvent and organic solvents may be used, and particularly examples of the organic solvent used include alcohols such as methanol, ethanol and the like, ketones such as acetone and the like, ethers such as tetrahydrofuran, diethyl ether, dibutyl ether, dimethoxyethane, dioxane and the like, aromatic hydrocarbons such as benzene, toluene, xylene, ethylbenzene and the like, aliphatic hydrocarbons such as pentane, hexane, heptane, cyclohexane, decalin and the like, halogenated hydrocarbons such as methylene chloride, dichloroethane, tetrachloroethane, chloroform, chlorobenzene, orthodichlorobenzene and the like, carboxylic acids such as acetic acid and the like, nitro compounds such as nitromethane and the like, pyridines such as pyridine, lutidine and the like, formamides such as dimethylformamide and the like, and these may be mixed with water or alcohols, or only the organic solvents may be used. Further, two or more among them may be mixed and used. The reaction temperature is usually from 0 to 200° C., preferably from 10 to 150° C., more preferably from room temperature to 200° C. The reaction time is usually from 1 minute to 100 hours, preferably from 5 minutes to 30 hours, more preferably from 10 minutes to 20 hours.

Embodiments of converting a carboxylic acid functional group into an ester in the method of the present invention are not particularly restricted and any embodiment is permissible provided that converting of a carboxylic acid functional group into an ester can be carried out effectively, and any embodiments under an inert gas atmosphere such as nitrogen and the like, under an air atmosphere, or at reduced pressure, normal pressure, increased pressure, or by batch type, semi-batch type or continuous type may be admitted.

Further, after converting the carboxylic acid functional group into the ester, neutralization treatment may be conducted appropriately with an alkali or acid. The method of recovering a polymer from a solution or slurry of a hydrogenated ring-opening metathesis polymer after converting the carboxylic acid functional group into the ester, is not particularly restricted and known methods can be used. For example, in the case of a solution, a method in which a reaction solution is discharged into a poor solvent under stirring to precipitate a hydrogenated polymer forming a slurry and the polymer is recovered by a filtration method, a centrifugal separation method, a decantation method and the like, a steam stripping method in which steam is blown into a reaction solution to precipitate a polymer, a method of directly removing a solvent from a reaction solution by heating and the like are listed, and in the case of a slurry, a method of recovering a polymer from a slurry itself by a filtration method, a centrifugal separation method, a decantation method and the like are listed, and other recovering method are listed.

The above-mentioned methods can produce a hydrogenated ring-opening metathesis polymer which contains, if necessary, a structural unit [A] of the general formula [1], contains a structural unit [B] of the general formula [3] and/or a structural unit [C] of the general formula [4], if necessary a structural unit [D] of the general formula [5], and further if necessary a structural unit [E] of the general formula [7], furthermore if necessary a structural unit [F] of the general formula [15] and in which at least one of $X^1$ in the structural unit (A) of the general formula [1], $X^2$ in the structural unit [B] of the general formula [3] and $X^3$ in the structural unit [C] of the general formula [4] represents —O—, the constituting molar ratio of [A]/([B] and [C]) is 0/100 to 99/1, preferably 20/80 to 99/1 and the ratio of the weight-average molecular weight Mw to the number-average molecular weight Mn (Mw/Mn) is more than 2.0 and less than 5.0.

The hydrogenated ring-opening metathesis polymer of the present invention is useful as a base polymer for a photoresist. For example, it is used together with an acid generator and a solvent providing a positive resist composition. Here, the acid generator is a substance which, when exposed to an activating radiation ray such as excimer laser, generates Brønsted acid or Lewis acid. Further, a dissolution inhibitor, a surfactant, a preservation stabilizer, a sensitizer, a striation preventing agent and the like can be added into a resist composition. This resist composition can be, for example be applied to the surface of a substrate such as a silicon wafer and the like by a conventional method such as spin coating and the like before removal of a solvent by drying, to form a resist film, and exposure for pattern formation is effected by irradiating a resist film with far ultraviolet ray, KrF excimer laser, ArF excimer laser or electron beam, and if heat treatment (bake after exposure) is further conducted, higher sensitization can be carried out. Then, the exposed part is washed off by a developer such as an alkali aqueous solution and the like, to obtain a relief pattern. A relief pattern formed by using a hydrogenated ring-opening metathesis polymer of the present invention is extremely excellent in both of resolution and contrast. Further, a substrate can be etched by using a pattern formed as described above as a mask.

In the present invention, the molar ratio of a structural unit [A] of the general formula [1] to a structural unit [B] of the general formula [3] and/or a structural unit [C] of the general formula [4] ([A]/([B] and [C])) is 20/80 to 99/1. As used herein, the structural unit [A], which contains a tertiary ester group of a cyclic alkyl which is a group decomposed by an acid generated from a sensitizing agent in exposure, is necessary for making a resist pattern by development with an alkali aqueous solution after exposure. The structural units [B] and [C] are necessary for manifesting adhesion with a substrate to be treated such as a silicon substrate. If this molar ratio [A]/([B] and [C]) is less than 20/80, development is insufficient and if the molar ratio is more than 99/1, adhesion with a substrate to be treated is not manifested. The structural unit [D] of the general formula [5], which contains a carboxyl group, can improve adhesion with a substrate to be treated such as a silicon substrate and can improve solubility into a solvent. Further, the molar ratio of the structural units [A], [B] and [C] to the structural unit [D] ([A]+[B]+[C])/[D] is preferably from 100/0 to 20/80, by which range, wet tension is improved in development with an alkali aqueous solution after exposure and development irregularity is resolved. This range including the structural units is suitable for preparing a resist composition and is extremely important for a resist material which is dissolved together with a sensitizing agent having high polarity into a polar solvent such as, for example, 2-heptanone and the like and applied to a substrate to be treated such as a silicon substrate. Namely, a uniform and smooth coating film can be formed by enhancing the solubility in a polar solvent or the dissolution rate in preparing a resist composition using a hydrogenated ring-opening metathesis polymer. Further, inclusion of the structural unit [E] in addition to the structural units [A] and [B] and/or [C] indicates inclusion of an ester group having different reactivity from that of an ester group in the structural unit [A], and is useful since, consequently, decomposing property in exposure can be freely controlled. In this case, the preferable molar ratio of the structural units ([A]+[B]+[C])/[E] is from 100/0 to 40/60.

Further, particularly a hydrogenated ring-opening metathesis polymer in which at least one of $X^1$ in the structural unit [A] of the general formula [1], $X^2$ in the structural unit [B] of the general formula [3] and $X^3$ in the structural unit [C] of the general formula [4] represents —O— and the others represent —$CH_2$—, has effects of improving adhesion to a substrate to be treated such as a silicon substrate, improving wet tension in development with an alkali aqueous solution, and further improving solubility into a polar organic solvent of ketones, alcohols and the like used in a process of applying a resist agent onto a silicon wafer. Further, affinity to water is also improved, and developing property with a releasing agent (or developer) such as an alkali aqueous solution and the like after exposure is also improved.

EXAMPLES

The following examples illustrate the present invention in detail below, but do not restrict the scope of the invention.

Values of the physical properties of polymers obtained in examples were measured according to the following methods.

Average molecular weight; The resulted cyclic olefin-based ring-opening metathesis polymer and a hydrogenated polymer thereof were dissolved in tetrahydrofuran and the molecular weight was calibrated by GPC, using 830-RI and 875-UV manufactured by JASCO Corporation as a detector and Shodexk-805, 804, 803 and 802.5 as a column, at room temperature and a flow rate of 1.0 ml/min utilizing polystyrene standard.

Hydrogenating rate; A powder of a cyclic olefin-based hydrogenated ring-opening metathesis polymer was dissolved in deuterated chloroform and reduction degree of the peak assigned to a carbon-carbon double bond in the main chain at $\delta=4.0$ to 6.5 ppm caused by a hydrogenation reaction was calculated by using 270 MHz-$^1$H NMR. Further, film thickness was measured for the whole spin-coated film with stanning the entire film by DEKTAK III manufactured by ULVAC Inc. The proportion of carboxylic acid contained in the polymer; It was measured by neutralization titration using Bromothymol blue as an indicator.

Example 1

In a 300 ml Schlenk flask, 3,6-epoxy-1,2,3,6-tetrahydrophthalide (4.33 g, 28.5 mmol) and 8-(1'-ethylcyclopentoxy)carbonyltetracyclo[4.4.0.1$^{2,5}$.1$^{7,10}$]-3-dodecene (8.56 g, 28.5 mmol) as cyclic olefin monomers were dissolved in 100 ml of tetrahydrofuran (hereinafter, referred to as THF) under a nitrogen atmosphere. To this was added 0.37 ml of 1,5-hexadiene (3.2 mmol) as a chain transfer agent and the mixture was stirred and then Mo(N-2,6-Pr$^i_2$C$_6$H$_3$)(CHCMe$_2$Ph)(OCMe(CF$_3$)$_2$)$_2$ (40 mg, 0.052 mmol) as a ring-opening metathesis polymerization catalyst was added thereto and the mixture was stirred at room temperature for 1 hour. Then, 3,6-epoxy-1,2,3,6-tetrahydrophthalide (4.33 g, 28.5 mmol), 8-(1'-ethylcyclopentoxy)carbonyltetracyclo[4.4.0.1$^{2,5}$.1$^{7,10}$]-3-dodecene (8.56 g, 28.5 mmol) and 0.74 ml of 1,5-hexadiene (6.4 mmol) dissolved in 100 ml of THF was added to the polymerization solution simultaneously with a solution of Mo(N-2,6-Pr$^i_2$C$_6$H$_3$)(CHCMe$_2$Ph)(OCMe(CF$_3$)$_2$)$_2$ (40 mg, 0.052 mmol) in THF as a ring-opening metathesis polymerization catalyst, and the mixture was further stirred at room temperature for 1 hour. Then, butylaldehyde (38 mg, 0.53 mmol) was added thereto and the mixture was stirred for 30 minutes.

To a 500 ml autoclave, were added the ring-opening metathesis polymer solution, a previously prepared solution of chlorohydride carbonyltris(triphenylphosphine)ruthenium (20 mg, 0.02 mmol) and triethylamine (1 mg, 0.01 mmol) in THF (20 ml) as a hydrogenation catalyst, hydrogenation was conducted for 8 hours at a hydrogen pressure of 8.1 MPa and a temperature of 125° C., and the temperature was returned to room temperature and a hydrogen gas was discharged. This hydrogenated ring-opening metathesis polymer solution was added into methanol to precipitate a hydrogenated ring-opening metathesis polymer which was separated by filtration and subjected to vacuum drying to provide 25.4 g of a hydrogenated ring-opening metathesis polymer in the form of a white powder. The hydrogenating rate calculated from $^1$H-NMR of the resulted hydrogenated ring-opening metathesis polymer did not manifest a peak assigned to a proton of an olefin in the main chain and the hydrogenating rate was 100% and the number-average molecular weight Mn in terms of polystyrene standard measured by GPC was 25,000 and Mw/Mn was 3.68. Further, the composition ratio of the structural units [A]/[B] in the resulted polymer was 50/50.

The $^1$H-NMR spectrum (270 MHz, solvent: deuterated chloroform) of the hydrogenated ring-opening metathesis polymer obtained in Example 1 is shown in FIG. 1.

Thus obtained polymer was dissolved in cyclohexanone to prepare two kinds of the solutions of 5 mass % and 10 mass %, and a film was prepared on a silicon wafer by a spin coating method. The solution of 5 mass % was applied at 3000 rpm and dried to give a uniform film of 0.25 µm, and further with the solution of 10 mass %, to give a uniform film of 0.49 µm thickness.

Comparative Example 1

In Example 1, 3,6-epoxy-1,2,3,6-tetrahydrophthalide (1.08 g, 7.12 mmol) and 8-(1'-ethylcyclopentoxy)carbonyltetracyclo[4.4.0.1$^{2,5}$.1$^{7,10}$]-3-dodecene (2.14 g, 7.12 mmol) as cyclic olefin monomers were dissolved in 25 ml of THF. To this was added Mo(N-2,6-Pr$^i_2$C$_6$H$_3$)(CHCMe$_2$Ph)(OCMe(CF$_3$)$_2$)$_2$ (218 mg, 0.285 mmol) as a ring-opening metathesis polymerization catalyst and the mixture was stirred at room temperature for 1 hour. Then, butylaldehyde (62 mg, 0.86 mmol) was added thereto and the mixture was stirred for 30 minutes. The obtained polymerization solution was hydrogenated 100% in the same manner as in Example 1, to give 3.3 g of a hydrogenated ring-opening metathesis polymer of which Mw measured by GPC was 23200 and Mw/Mn was 1.21. A film was formed by spin coating in the same manner as in Example 1 and a solution of 5% by weight was applied at 3000 rpm and dried to give a uniform film of 0.28 µm, and with the solution of 10% by weight, to give a non-uniform film of 0.55 µm in which interference pattern was observed partially. It is considered that condition ranges for obtaining a uniform film is narrow for films having a narrow molecular weight distribution as compared with films having a broad molecular weight distribution.

Example 2

In a 2000 ml eggplant type flask, 20.0 g of the hydrogenated ring-opening metathesis polymer obtained in Example 1 was added to a solution of 5.0 ml of trifluoroacetic acid in 1000 ml of toluene, and the mixture was stirred at 70° C. for 2 hours, the solvent was distilled off, and then the resulted mixture was further dissolved in THF, added into methanol, filtrated and dried in vacuum to provide 18.2 g of a hydrogenated ring-opening metathesis polymer which was partially ester-decomposed in the form of a white powder. The composition ratio of the structural units [A]/[B]/[D] in the resulted polymer was 35/50/15, and the number-average molecular weight Mn measured by GPC was 23000 and Mw/Mn was 3.69.

Thus obtained polymer was prepared as a film in the same manner as in Example 1. The solution of 5% bt weight was applied at 3000 rpm and dried to give a uniform film of 0.26 µm, and further with the solution of 10% by weight, to give a uniform film of 0.50 µm thickness.

Comparative Example 2

3.0 g of the hydrogenated ring-opening metathesis polymer obtained in Comparative Example 1 was treated in the same manner as in Example 2, to give 2.4 g of partially ester-decomposed a hydrogenated ring-opening metathesis polymer. The composition ratio of the structural units [A]/[B]/[D] in the resulted polymer was 36/50/14, Mw measured by GPC was 21700 and Mw/Mn was 1.30.

Thus obtained polymer was prepared as a film in the same manner as in Example 1. The solution of 5% by weight was applied at 3000 rpm and dried to give a uniform film of 0.24 μm, and further with the solution of 10% by weight, to give a non-uniform film of 0.47 μm in which interference pattern was partially observed. It is considered that condition ranges for obtaining a uniform film is narrow for films having a narrow molecular weight distribution as compared with films having a broad molecular weight distribution.

Example 3

In a 300 ml Schlenk flask, 3,6-epoxy-1,2,3,6-tetrahydrophthalide (8.66 g, 57.0 mmol), 8-(1-ethylcyclopentoxy)carbonyltetracyclo[4.4.0.1$^{2,5}$.1$^{7,10}$]-3-dodecene (17.12 g, 57.0 mmol) and 0.74 ml of 1,5-hexadiene (6.4 mmol) as cyclic olefin monomers were dissolved in 200 ml of THF under a nitrogen atmosphere. To this was added W(N-2,6-Pr$^i_2$C$_6$H$_3$)(CHCMe$_2$Ph)(OCMe(CF$_3$)$_2$)$_2$ (17 mg, 0.02 mmol) as a ring-opening metathesis polymerization catalyst, the mixture was stirred at room temperature for 10 minutes, a solution of 68 mg (0.08 mol) of the same catalyst in THF was further added thereto and the mixture was further stirred at room temperature for 1 hour. Then, butylaldehyde (26 mg, 0.36 mmol) was added thereto and the mixture was stirred for 30 minutes.

The obtained polymerization solution was hydrogenated in the same manner as in Example 1 to give 25.6 g of a hydrogenated ring-opening metathesis polymer having 100% hydrogenation rate in the form of a white powder. Mw in terms of polystyrene standard measured by GPC was 10200 and Mw/Mn was 3.20. Further, the composition ratio of structural units [A]/[B] of the obtained polymer was 50/50.

Thus obtained polymer was prepared as a film in the same manner as in Example 1. The solution of 5% by weight was applied at 3000 rpm and dried to give a uniform film of 0.21 μm, and further with the solution of 10% bt weight, to give a film having a uniform thickness of 0.42 μm.

Example 4

In a 300 ml Schlenk flask, 3,6-epoxy-1,2,3,6-tetrahydrophthalide (8.70 g, 57.2 mmol) and 8-(1'-ethylcyclopentoxy)carbonyltetracyclo[4.4.0.1$^{2,5}$.1$^{7,10}$]-3-dodecene (17.18 g, 57.2 mmol) and 0.74 ml (6.4 mmol) of 1,5-hexadiene as cyclic olefin monomers were dissolved in 200 ml of THF under a nitrogen atmosphere. To this was added a solution of Mo(N-2,6-Pr$^i_2$C$_6$H$_3$)(CHCMe$_2$Ph)(OCMe(CF$_3$)$_2$)$_2$ (23 mg, 0.03 mmol) and W(N-2,6-Pr$^i_2$C$_6$H$_3$)(CHCMe$_2$Ph)(OCMe(CF$_3$)$_2$)$_2$ (60 mg, 0.07 mmol) as ring-opening metathesis polymerization catalysts in THF and the mixture was stirred at room temperature for 1 hour. Then, butylaldehyde (13 mg, 0.18 mmol) was added thereto and the mixture was stirred for 30 minutes.

The obtained polymerization solution was hydrogenated in the same manner as in Example 1 to give 25.6 g of a hydrogenated ring-opening metathesis polymer having 100% hydrogenation rate in the form of a white powder. Mw in terms of polystyrene standard measured by GPC was 14300 and Mw/Mn was 3.10. Further, the composition ratio of structural units [A]/[B] of the obtained polymer was 50/50.

Thus obtained polymer was prepared as a film in the same manner as in Example 1. The solution of 5% by weight was applied at 3000 rpm and dried to give a uniform film of 0.22 μm a film of was obtained, and further with the solution of 10% by weight, to give a uniform film of 0.44 μm thickness.

Comparative Example 3

Polymerization was conducted in the same manner as in Comparative Example 1 except that 400 mg (0.522 mmol) of Mo(N-2,6-Pr$^i_2$C$_6$H$_3$)(CHCMe$_2$Ph)(OCMe(CF$_3$)$_2$)$_2$ was used as a ring-opening metathesis polymerization catalyst, and further hydrogenated, to give 3.2 g of a hydrogenated ring-opening metathesis polymer having 100% hydrogenation rate in the form of a white powder. Mw measured by GPC was 12800 and Mw/Mn was 1.23.

A film was formed by spin coating in the same manner as in Example 1. The solution of 5% by weight was applied at 3000 rpm and dried to give a uniform film of 0.17 μm, and further with the solution of 10% by weight, to give a non-uniform film of 0.45 μm in which interference pattern was partially observed. It is considered that condition ranges for obtaining a uniform film is narrow for films having a narrow molecular weight distribution as compared with films having a broad molecular weight distribution.

Example 5

Polymerization was conducted in the same manner as in Example 4 except that a solution of W(N-2,6-Me$_2$C$_6$H$_3$)(thf)(OCMe$_2$CF$_3$)$_2$Cl$_2$ (49 mg, 0.07 mmol), 0.03 mmol of triethylaluminum and W(N-2,6-Pr$^i_2$C$_6$H$_3$)(CHCMe$_2$Ph)(OCMe(CF$_3$)$_2$)$_2$ (60 mg, 0.07 mmol) in toluene was used as a ring-opening metathesis polymerization catalyst and 1.06 ml (9.2 mmol) of 1,5-hexadiene was used as a chain transfer agent and further hydrogenated, to give 24.2 g of a hydrogenated ring-opening metathesis polymer having 100% hydrogenation rate in the form of a white powder. Mw in terms of polystyrene standard measured by GPC was 25400 and Mw/Mn was 4.32. Further, the composition ratio of structural units [A]/[B] of the obtained polymer was 50/50.

The obtained polymer was prepared as a film in the same manner as in Example 4. The solution of 5% by weight was applied at 3000 rpm and dried to give a uniform film of 0.28 μm, and further with the solution of 10% by weight, to give a uniform film of 0.54 μm thickness.

Further, 18.2 g of partially ester-decomposed hydrogenated ring-opening metathesis polymer was obtained. The composition ratio of the structural units [A]/[B]/[D] in the resulted polymer was 40/50/10, Mw measured by GPC was 24800 and Mw/Mn was 4.69.

Thus obtained polymer was prepared as a film in the same manner as in Example 1. The solution of 5% by weight was applied at 3000 rpm and dried to give uniform film of 0.28 μm, and further with the solution of 10% by weight, to give a uniform film of 0.54 μm thickness.

The resolutions in exposure to KrF excimer laser were evaluated using the polymers of Examples and Comparative Examples as a base resin. 1 part by mass of an acid generator represented by the following formula [18] (PAG 1), 0.078 part by mass of tributylamine as a basic compound and 640 parts by mass of cyclohexanone as a solvent were mixed based on 80 parts by mass of each polymer. Then, these were filtrated through a Teflon (trademark) filter (pore diameter: 0.2 μm) to give a resist material. The resist solution was applied by spin coating on a silicon wafer on which a reflection reducing film (DUV 30 manufactured by Nissan Chemical Industries, LTD, 55 nm) had been applied, and heated at 130° C. for 90 seconds to form a resist film of 485 nm thickness. This was exposed by using a KrF excimer laser stepper (manufactured by Nikon Corp., NA=0.5) and heated at 110° C. for 90 seconds, then, paddle development was conducted for 60 seconds using an aqueous 2.38% tetramethylammonium hydroxide solution, to form a line and space pattern of 1:1. The developed wafer was cut and the cut section was observed by SEM (scanning electron microscope) and the minimum line width (μm) of line and space separated at the exposure amount (optimum exposure amount=Eop, mJ/cm$^2$) which resolves line and space of 0.30 μm at 1:1 was regarded as the resolution of a resist to be evaluated. Pattern shapes in this process were classified into any of rectangle, rounded head, T-top, ordinary taper and reverse taper. Further, all solvents contained FC-430 (manufactured by SUMITOMO 3M Limited) in an amount of 0.05% by weight.

Performances of polymers when forming a resist film were evaluated for a film prepared with a polymer concentration of 5 mass % and as results, it was found that the edge at 0.24 μm resolution was sharp rectangle, which had no problem.

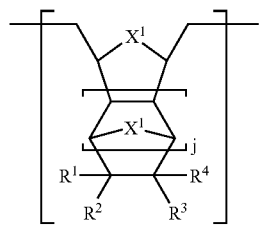

[18]

The hydrogenated ring-opening metathesis polymer and a method of producing the same of the present invention are extremely valuable from the industrial standpoint since they provide a polymer which is excellent in heat resistance, thermal decomposition resistance, light transmittance and the like and further, useful for a photoresist film for fine processing of a semiconductor using ultraviolet ray or far ultraviolet ray.

What is claimed is:

1. A hydrogenated ring-opening metathesis polymer which contains at least one of structural unit [B] and structural unit [C] and which optionally contains structural unit [A] with structural unit [A] having the following general formula [1]:

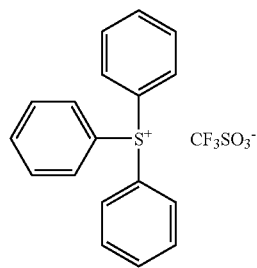

[1]

wherein at least one of $R^1$ to $R^4$ represents a functional group having a tertiary ester group of a cyclic alkyl of the following general formula [2]:

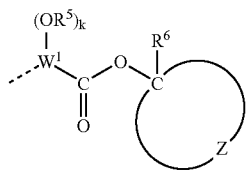

[2]

wherein the chain line represents a connecting means, $R^5$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms, $R^6$ represents a linear, branched or cyclic alkyl group having 1 to 10 carbon atoms, $W^1$ represents a single bond or a (k+2)-valent hydrocarbon group having 1 to 10 carbon atoms, Z represents a divalent hydrocarbon group having 2 to 15 carbon atoms and forms a single ring or a cross-linked ring together with carbon atoms to be bonded, k represents 0 or 1, and the remaining groups of $R^1$ to $R^4$ are selected each independently from a hydrogen atom, a linear, branched or cyclic alkyl group having 1 to 20 carbon atoms, halogen atoms, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms, and $X^1$s are the same or different and represent —O— or —$CR^7_2$— wherein $R^7$ represents a hydrogen atom or a linear or branched alkyl group having 1 to 10 carbon atoms, j represents an integer of 0 or 1 to 3, structural unit [B] having the following general formula [3]:

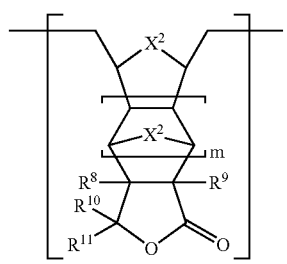

[3]

wherein $R^8$ to $R^{11}$ each independently represent a hydrogen atom or a linear, branched or cyclic alkyl group having 1 to 10 carbon atoms, and $X^2$s are the same or different and represent —O— or —$CR^{12}_2$— wherein $R^{12}$ represents a hydrogen atom or a linear or branched alkyl group having 1 to 10 carbon atoms, m represents an integer of 0 or 1 to 3, and structural unit [C] having the following general formula [4]:

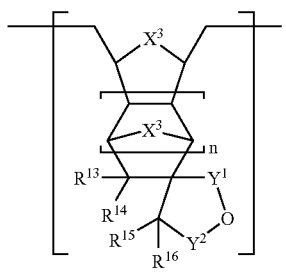

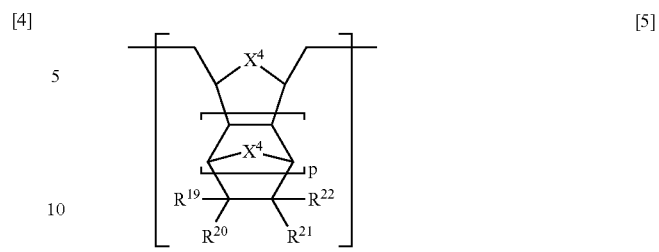

wherein $R^{13}$ to $R^{16}$ each independently represent a hydrogen atom or a linear, branched or cyclic alkyl group having 1 to 10 carbon atoms, and $X^3$s are the same or different and represent —O— or —$CR^{17}_2$— wherein $R^{17}$ represents a hydrogen atom or a linear or branched alkyl group having 1 to 10 carbon atoms, one of $Y^1$ and $Y^2$ represents —(C=O)— and the other of $Y^1$ and $Y^2$ represents —$CR^{18}_2$— wherein $R^{18}$ represents a hydrogen atom or a linear or branched alkyl group having 1 to 10 carbon atoms, n represents an integer of 0 or 1 to 3, wherein at least one of $X^1$ in the structural unit [A] of the general formula [1], $X^2$ in the structural unit [B] of the general formula [3] and $X^3$ in the structural unit [C] of the general formula [4] represents —O—, and wherein the molar ratio of [A]/([B] and [C]) is 0/100 to 99/1 and the ratio of the weight-average molecular weight Mw to the number-average molecular weight Mn (Mw/Mn) is more than 2.0 and less than 5.0.

2. The hydrogenated ring-opening metathesis polymer according to claim 1, wherein the molar ratio of the structural unit [A] of the general formula [1] to the structural unit [B] of the general formula [3] and the structural unit [C] of the general formula [4] ([A]/([B] and [C])) is from 25/75 to 90/10.

3. The hydrogenated ring-opening metathesis polymer according to claim 1, wherein the molar ratio of the structural unit [A] of the general formula [1] to the structural unit [B] of the general formula [3] and the structural unit [C] of the general formula [4] ([A]/([B] and [C])) is 30/70 to 85/15.

4. The hydrogenated ring-opening metathesis polymer according to claim 1, wherein at least one of $X^1$ in the structural unit [A] of the general formula [1], $X^2$ in the structural unit [B] of the general formula [3] and $X^3$ in the structural unit [C] of the general formula [4] represents —O— and the others represent —$CH_2$—.

5. The hydrogenated ring-opening metathesis polymer according to claim 1, wherein a functional group having a tertiary ester group of a cyclic alkyl in the general formula [2] selected as the at least one of $R^1$ to $R^4$ in the general formula [1], is 1-alkylcyclopentylester, 1-alkylnorbornylester or 2-alkyl-2-adamantylester.

6. The hydrogenated ring-opening metathesis polymer according to claim 1, wherein $W^1$ in the general formula [2] is a single bond.

7. The hydrogenated ring-opening metathesis polymer according to claim 1, which optionally contains a structural unit [D] of the following general formula [5]:

wherein at least one of $R^{19}$ to $R^{22}$ represents a functional group having a carboxyl group of the following general formula [6]:

$$\begin{array}{c} (OR^{23})_q \\ | \\ \cdots W^2 \!-\! C \!-\! OH \\ \| \\ O \end{array} \quad [6]$$

wherein the chain line represents a connecting means, $R^{23}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms, $W^2$ represents a single bond or a (q+2)-valent hydrocarbon group having 1 to 10 carbon atoms, q represents 0 or 1, and the remaining groups of $R^{19}$ to $R^{22}$ are selected each independently from a hydrogen atom, a linear, branched or cyclic alkyl group having 1 to 20 carbon atoms, halogen atoms, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $X^4$s are the same or different and represent —O— or —$CR^{24}_2$— wherein $R^{24}$ represents a hydrogen atom or a linear or branched alkyl group having ito 10 carbon atoms, p represents an integer of 0 or 1 to 3.

8. The hydrogenated ring-opening metathesis polymer according to claim 7, wherein the molar ratio of the structural unit [A] of the general formula [1], the structural unit [B] of the general formula [3] and the structural unit [C] of the general formula [4] to the structural unit [D] of the general formula [5] (([A]+[B]+[C])/[D]) is from 100/0 to 20/80.

9. The hydrogenated ring-opening metathesis polymer according to claim 7, wherein $X^4$ in the general formula [5] is —O— or —$OH_2$—.

10. The hydrogenated ring-opening metathesis polymer according to claim 7, wherein $W^2$ in the general formula [6] is a single bond.

11. The hydrogenated ring-opening metathesis polymer according to claim 1, which optionally contains a structural unit [E] of the following general formula [7]:

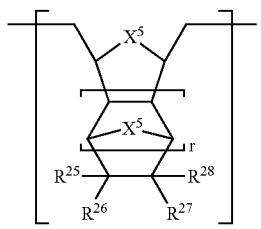

wherein at least one of $R^{25}$ to $R^{28}$ represents a functional group having a carboxylic acid ester group of the following general formula [8]:

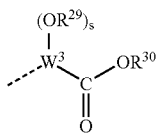

wherein the chain line represents a connecting means, $R^{29}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms, $R^{30}$ represents a linear or branched alkyl group having 1 to 10 carbon atoms, a linear, branched or cyclic alkoxyalkyl group having 2 to 10 carbon atoms, or a linear, branched or cyclic halogenated alkyl group having 1 to 20 carbon atoms, $W^3$ represents a single bond or a(s+2)-valent hydrocarbon group having 1 to 10 carbon atoms, s represents 0 or 1, and the remaining groups of $R^{25}$ to $R^{28}$ are selected each independently from a hydrogen atom, a linear, branched or cyclic alkyl group having 1 to 20 carbon atoms, halogen atoms, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $X^5$s are the same or different and represent —O— or —$CR^{31}_2$— wherein $R^{31}$ represents a hydrogen atom or a linear or branched alkyl group having 1 to 10 carbon atoms, and r represents an integer of 0 or 1 to 3.

12. The hydrogenated ring-opening metathesis polymer according to claim 11, wherein the molar ratio of the structural unit [A] of the general formula [1], the structural unit [B] of the general formula [3] and the structural unit [C] of the general formula [4] to the structural unit [E] of the general formula [7] (([A]+[B]+[C])/[E]) is from 100/0 to 40/60.

13. The hydrogenated ring-opening metathesis polymer according to claim 11, wherein $X^5$ in the general formula [7] is —O— or —$CH_2$—.

14. The hydrogenated ring-opening metathesis polymer according to claim 11, wherein $W^3$ in the general formula [8] is a single bond.

15. The hydrogenated ring-opening metathesis polymer according to claim 1, wherein the weight-average molecular weight in terms of polystyrene measured by GPC is from 500 to 1,000,000.

16. A method of producing a hydrogenated ring-opening metathesis polymer according to claim 1 comprising
polymerizing at least one cyclic olefin monomer of general formula [10] and/or general formula [11] and optionally a cyclic olefin monomer of general formula [9] in the presence of a ring-opening metathesis catalyst wherein general formula [9] is:

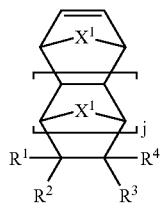

wherein $R^1$ to $R^4$, $X^1$ and j are as defined in the general formula [1],
general formula [10] is:

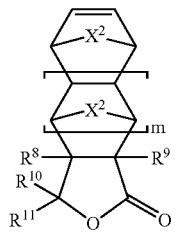

wherein $R^8$ to $R^{11}$, $X^2$ and m are as defined in the general formula [3], and
general formula [11] is:

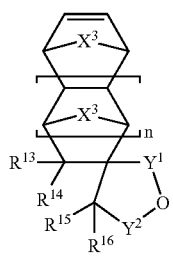

wherein $R^{13}$ to $R^{16}$, $X^3$, $Y^1$, $Y^2$ and n are as defined in the general formula [4], and wherein at least one of $X^1$ in the general formula [9], $X^2$ in the general formula [10] and $X^3$ in the general formula [11] represents —O—, and
hydrogenating the resulting polymer in the presence of a hydrogenation catalyst.

17. The method of producing a hydrogenated ring-opening metathesis polymer according to claim 16, wherein the polymerizing is conducted through at least 2 steps and then hydrogenated in the presence of the hydrogenation catalyst.

18. The method of producing a hydrogenated ring-opening metathesis polymer according to claim 16, wherein the polymerizing is conducted in the presence of at least 2 kinds of the polymerization catalysts and then hydrogenated in the presence of the hydrogenation catalyst.

19. The method of producing a hydrogenated ring-opening metathesis polymer according to claim 16, wherein a charging molar ratio of the cyclic olefin monomer of the general formula [9] to the cyclic olefin monomer of the general formula [10] and the cyclic olefin monomer of the general formula [11] is from 0/100 to 99/1.

20. The method of producing a hydrogenated ring-opening metathesis polymer according to claim 16, wherein a charging molar ratio of the cyclic olefin monomer of the general formula [9] to the cyclic olefin monomer of the general formula [10] and the cyclic olefin monomer of the general formula [11] is from 25/75 to 90/10.

21. The method of producing a hydrogenated ring-opening metathesis polymer according to claim 16, wherein at least one of $X^1$ in the cyclic olefin monomer of the general formula [9], $X^2$ in the cyclic olefin monomer of the general formula [10] and $X^3$ in the cyclic olefin monomer of the general formula [11] represents —O— and the others represent —OH$_2$—.

22. The method of producing a hydrogenated ring-opening metathesis polymer according to claim 16, wherein the functional group having a tertiary ester group of a cyclic alkyl in the general formula [2] selected as the at least one of $R^1$ to $R^4$ in the general formula [9], is 1-alkylcyclopentylester, 1-alkylnorbornylester or 2-alkyl-2-adamantylester.

23. The method of producing a hydrogenated ring-opening metathesis polymer according to claim 16 comprising decomposing at least part of the tertiary ester group of a cyclic alkyl in the general formula [2] to a carboxyl group after hydrogenation.

24. The method of producing a hydrogenated ring-opening metathesis polymer according to claim 16 comprising using further a cyclic olefin monomer of the following general formula [12]:

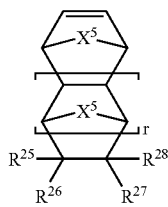

[12]

wherein at least one of $R^{25}$ to $R^{28}$ represents a functional group having a carboxylic acid ester group of the following general formula [8]:

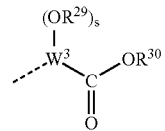

[8]

wherein the chain line represents a connecting means, $R^{29}$ represents a hydrogen atom, a linear, branched or cyclic alkyl group having 1 to 10 carbon atoms, a linear, branched or cyclic alkoxyalkyl group having 2 to 10 carbon atoms, or a linear, branched or cyclic acyl group having 1 to 10 carbon atoms, $R^{30}$ represents a linear or branched alkyl group having 1 to 10 carbon atoms, a linear, branched or cyclic alkoxyalkyl group having 2 to 10 carbon atoms, or a linear, branched or cyclic halogenated alkyl group having 1 to 20 carbon atoms, $W^3$ represents a single bond or a(s+2)-valent hydrocarbon group having 1 to 10 carbon atoms, s represents 0 or 1, and the remaining groups of $R^{25}$ to $R^{28}$ are selected each independently from a hydrogen atom, a linear, branched or cyclic alkyl group having 1 to 20 carbon atoms, halogen atoms, a linear, branched or cyclic halogenated alkyl group having 1 to 20 carbon atoms, a linear, branched or cyclic alkoxy group having 1 to 20 carbon atoms, a linear, branched or cyclic alkoxyalkyl group having 2 to 20 carbon atoms, a linear, branched or cyclic alkylcarbonyloxy group having 2 to 20 carbon atoms, an arylcarbonyloxy group having 6 to 20 carbon atoms, a linear, branched or cyclic alkylsulfonyloxy group having 1 to 20 carbon atoms, an arylsulfonyloxy group having 6 to 20 carbon atoms, a linear, branched or cyclic alkoxycarbonyl group having 2 to 20 carbon atoms, or a linear, branched or cyclic alkoxycarbonylalkyl group having 3 to 20 carbon atoms and $X^5$s are the same or different and represent —O— or —CR$^{31}_2$— wherein $R^{31}$ represents a hydrogen atom or a linear or branched alkyl group having 1 to 10 carbon atoms, r represents an integer of 0 or 1 to 3.

25. The method of producing a hydrogenated ring-opening metathesis polymer according to claim 24 comprising decomposing at least part of the ester group to a carboxyl group after hydrogenation.

26. The method of producing a hydrogenated ring-opening metathesis polymer according to claim 16, wherein the ring-opening metathesis catalyst is a living ring-opening metathesis catalyst.

27. The method of producing a hydrogenated ring-opening metathesis polymer according to claim 16, wherein polymerization is conducted with a ring-opening metathesis catalyst in the presence of an olefin or diene.

* * * * *